(12) United States Patent
Gujarathi

(10) Patent No.: US 11,962,586 B2
(45) Date of Patent: Apr. 16, 2024

(54) SECONDARY MULTIFACTOR AUTHENTICATION

(71) Applicant: Citrix Systems, Inc., Fort Lauderdale, FL (US)

(72) Inventor: Ashish Gujarathi, Parkland, FL (US)

( * ) Notice: Subject to any disclaimer, the term of this patent is extended or adjusted under 35 U.S.C. 154(b) by 343 days.

(21) Appl. No.: 17/329,761

(22) Filed: May 25, 2021

(65) Prior Publication Data

US 2022/0385656 A1 Dec. 1, 2022

(51) Int. Cl.
*H04L 29/06* (2006.01)
*H04L 9/40* (2022.01)

(52) U.S. Cl.
CPC ........ *H04L 63/0876* (2013.01); *H04L 63/107* (2013.01); *H04L 63/108* (2013.01)

(58) Field of Classification Search
CPC .. H04L 63/0876; H04L 63/107; H04L 63/108
See application file for complete search history.

(56) References Cited

U.S. PATENT DOCUMENTS

| | | | |
|---|---|---|---|
| 8,136,148 B1 * | 3/2012 | Chayanam | G06F 21/34 715/780 |
| 9,801,066 B1 | 10/2017 | Hanley et al. | |
| 11,552,953 B1 * | 1/2023 | Avadhanam | H04L 63/102 |
| 2016/0134634 A1 * | 5/2016 | Rosendal | H04W 12/065 726/4 |
| 2016/0359838 A1 * | 12/2016 | Dasgupta | H04L 63/08 |
| 2018/0097840 A1 | 4/2018 | Murthy | |
| 2018/0343246 A1 * | 11/2018 | Benayed | H04L 9/3226 |
| 2019/0182287 A1 * | 6/2019 | Hanley | H04L 63/20 |
| 2019/0268156 A1 * | 8/2019 | Delmas | G06F 21/31 |
| 2020/0082108 A1 | 3/2020 | Griffin | |
| 2022/0210151 A1 * | 6/2022 | Williams | H04L 63/0861 |

OTHER PUBLICATIONS

International Search Report and Written Opinion on PCT Appl. No. PCT/US2022/030079 dated Sep. 13, 2022.

* cited by examiner

*Primary Examiner* — Darshan I Dhruv

(57) ABSTRACT

Described embodiments provide systems, methods, non-transitory computer-readable medium for initiating one-factor or multi-factor authentication. A device comprising one or more processors and coupled to memory. The device can receive a request to authenticate a user to enable access to an application by the user. The request can originate from an Internet Protocol (IP) address external to a network hosting the application. The device can determine that a previous request to authenticate the user originated from the IP address and was approved based on successful completion of multi-factor authentication by the user. The device can provide, responsive to the determination, the user with access to the application using one-factor authentication instead of the multi-factor authentication.

20 Claims, 8 Drawing Sheets

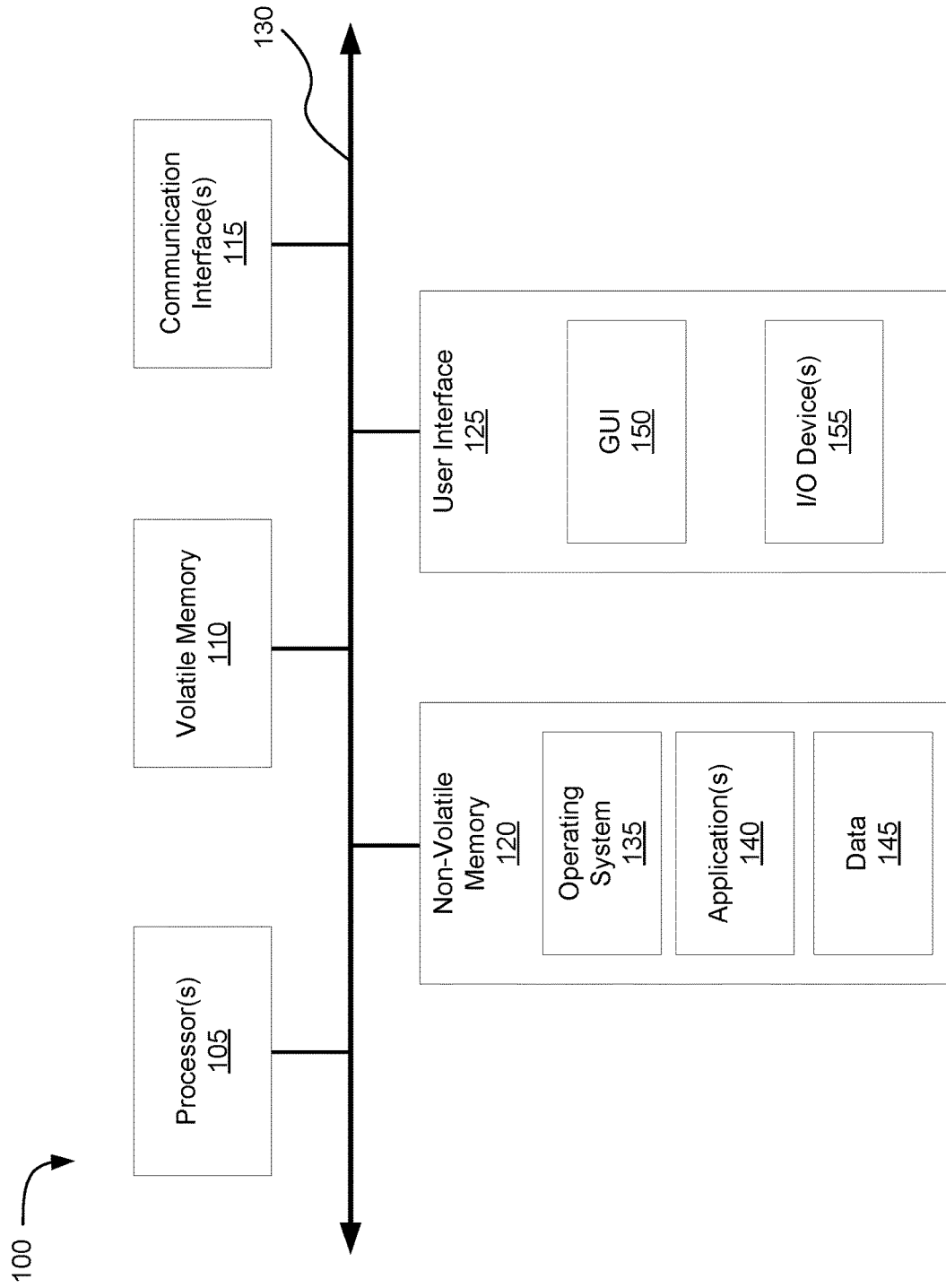

SECONDARY MULTIFACTOR AUTHENTICATION

FIELD OF THE DISCLOSURE

The present application generally relates to access to computing resources, including but not limited to systems and methods of multi-factor authentication.

BACKGROUND

Client devices can request access to a resource. When requesting access, client devices may be prompted to input client credential information for authentication purposes. The prompt can include one or more authentication techniques, such as passcode input or push notification confirmation to verify user identity. Upon successful verification of the user credential information, a user can be permitted with access to the resource.

BRIEF SUMMARY

When verifying user access to resources, multi-factor authentication ("MFA") can be used to determine whether to provide users with access to the resources. Under MFA, one factor, multiple pieces of factors may be used to authenticate the user. For example, the first factor may be a prompt for the user to enter an account identifier and a passcode. Once the first factor is successfully verified, the second factor used for authentication is to push notification to a device associated with the user. The device can be a mobile device registered by the user for MFA.

To facilitate authentication in accordance with the MFA, enterprises may have applications that can be accessed by the user. Some of these applications use the same identity provider ("IDP"). The enterprise can delegate the storage and verification of user identities to an IDP. The IDP can manage the verification of user identities for all applications, such as by using push notification as the second factor in the MFA.

On the client, an application (e.g., a native application, a mobile application, or a web application) may rely on resources hosted on the server for performing various tasks. When the user opens an application to access a service, the user may be requested by the IDP to enter their credentials and approve a push notification. This can apply to other types of MFA in addition to push notification, such as entering a time-based one-time passcode ("TOTP") value sent to an authentication device (e.g., mobile device) of the user.

Once the authentication credentials are approved, the IDP may provide a cookie or other tracking means indicating the approval of the authentication for the application to the client device. Upon receipt, the client device may associate the cookie with the application and store the cookie along with the association. Since all of the client-side applications are distinct applications with their respective local storage, an IDP web page loaded within a web view in an application (e.g., requesting credentials from the user) cannot share data or any context with other applications (e.g., "trusted device", "avoid future prompt", or "remember me"). The association may be limited to the application, and not any other applications on the client, due to security policies set by the operating system on the client device.

In subsequent attempts to access resources for the application, the client may include the cookie in the request. The IDP may recognize the cookie in the request and may permit the user to access the application without undergoing MFA. For other applications without any previous authentications, however, the client may lack any associated cookie and thus the request sent to the IDP may also lack any cookies. As a result, the IDP may not recognize that the user had previously been authenticated, and thus may prompt the user to again undergo MFA. The repeated prompting of the user for authentication credentials may be severely detrimental to the quality of human-computer interactions (HCI) between the user and the applications on the client. For instance, every time the user is to start using the workstation, the user may have to approve the push notification at least 4-5 times for all the applications, before the user can begin work from the client device. This repetitive process of MFA for each application may be exacerbated when the IDP is reset every day, thereby refreshing records of previous successful authentications by the user. Moreover, it can be challenging to minimize MFA for accessing one or more applications with the same IDP after successfully verifying the user identity for an application, since context from applications may not be shared with other applications accessible by the user. Therefore, it can be time-consuming for users to provide MFA for all applications with the same IDP. Also, additional computing resources and network bandwidth may have to be consumed to carry out the MFA for each and every application that the user tries to access for the first time.

To address these and other technical challenges from repeated prompts for MFA, the IDP may rely on a low-risk scenario when receiving a request to access one or more additional applications from the user. Minimizing MFA can refer to using one-factor authentication instead of multiple factors to verify the user identity to provide resource access to the client device. The IDP can monitor user patterns or factors (e.g., access time, access duration, locations of an authentication device, an IP address from which requests are sent, etc.) to build a user profile for a respective user. The context from the user profile, different from the context of individual applications, can be compared to the context of the client device during an authentication attempt to determine the risk level. If the risk is low, the IDP can reduce the number of multi-factor prompts, thereby minimizing MFA when accessing applications from the same IDP.

The IDP can identify whether the following conditions are met to determine or consider the access request a low-risk scenario, such that a single factor authentication is sufficient. For example, the IDP can determine whether the user has been authenticated within a period of time (e.g., a predetermined time of 15 minutes, 30 minutes, 1 hour, etc.) from a certain IP address (e.g., client-source IP address). The IDP can further determine whether a subsequent access request (e.g., from the user to another application) is from the same IP address. The IP address can be associated with a location of the user or an access point connected to a client device of the user.

The IDP can determine whether the IP address is consistently used by the user (e.g., home IP address) among other IP addresses. The IDP can identify that no other user has authenticated from this IP address, such as to use one or more applications from the same IDP (e.g., Office-NAT ("Network Address Translation") or proxy). The IDP can determine whether the time of the authentication request follows a pattern for the particular user (e.g., timeframe that the user accesses each application, duration of accessing each application, etc.). The IDP can determine whether the location of a registered device (e.g., authentication device of the user used for push notification, among other MFA) can be identified (e.g., a push application can report the location of the device). The IDP can determine whether the location of the registered device is at one of the locations used consistently by the user (e.g., home or office). Based on these determinations, the IDP can skip a second-factor authentication or provide one-factor authentication for verifying the use based on one or more of the aforementioned conditions. The conditions can refer to the activities or context of the user when requesting to access one or more applications.

In case any of the conditions are violated (e.g., a colleague visits the user and logs in from the user's home network or using the same IP address to access the colleague's account in an application), the metrics tracking the conditions may be reset or adjusted downward. By violating at least one of the conditions, the IDP may request a second-factor authentication from the user a number of subsequent requests to access applications or optimization of MFA may get disabled for the user (e.g., for a predetermined time or predetermined number of successful identity verification without violation of any condition).

Over time, as the user progress to satisfy the conditions, the metrics tracking the conditions can stabilize and the user's MFA prompts can reduce. Thus, by minimizing MFA prompts based on the computed risk of the authentication attempt, the IDP can reduce network traffic between client devices or the IDP itself (e.g., reduce requests for second-factor authentication from client devices, the transmission of second-factor authentication from IDP, and credential information from client devices), improve authorized user experience when accessing applications from the same IDP (e.g., not being prompted for MFA for one or more applications), reduce access time to applications, and improve user verification process.

One or more aspects of this disclosure are directed to systems, methods, devices, non-transitory computer-readable medium for initiating one-factor or multi-factor authentication. A device can minimize the MFA prompts based on the risk of the authentication attempt. The device can receive a request to authenticate a user to enable access to an application by the user. The request can from an IP address external to a network hosting the application. The device can determine that a previous request to authenticate the user originated from the IP address and was approved based on successful completion of multi-factor authentication by the user. The device can provide, responsive to the determination, the user with access to the application using one-factor authentication instead of the multi-factor authentication.

In some implementations, the device can determine that a number of times that the user had authenticated from that IP address is greater than a second threshold. The device can use the one-factor authentication instead of another multi-factor authentication responsive to determining that the user had authenticated the number of times from the IP address using the multi-factor authentication greater than the second threshold and within a threshold of a time period from the previous request. In some implementations, the device can determine that no other user has authenticated from the IP address within at least a time period from the previous request. The device can use the one-factor authentication instead of another multi-factor authentication responsive to determining that the user had authenticated from the IP address using the multi-factor authentication within a threshold of the time period from the previous request and that no other user has authenticated from that IP address within at least the time period.

In some implementations, the device can determine that a time of the request falls within an established time pattern for the user. The device can use the one-factor authentication instead of another multi-factor authentication responsive to determining that the user had authenticated from the IP address using the multi-factor authentication within a threshold of a time period from the previous request and that the time of the request falls within the established time pattern for the user. In some implementations, the device can identify that a second device with which the user has performed the multi-factor authentication is at a location of a third device having the IP address. The device can use the one-factor authentication instead of another multi-factor authentication responsive to determining that the user had authenticated from the IP address using the multi-factor authentication within a threshold of a time period from the previous request and identifying that the second device is at the location of the third device.

These and other aspects and implementations are discussed in detail below. The foregoing information and the following detailed description include illustrative examples of various aspects and implementations, and provide an overview or framework for understanding the nature and character of the claimed aspects and implementations.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 1A is a block diagram of embodiments of a computing device;

Figure 1B:
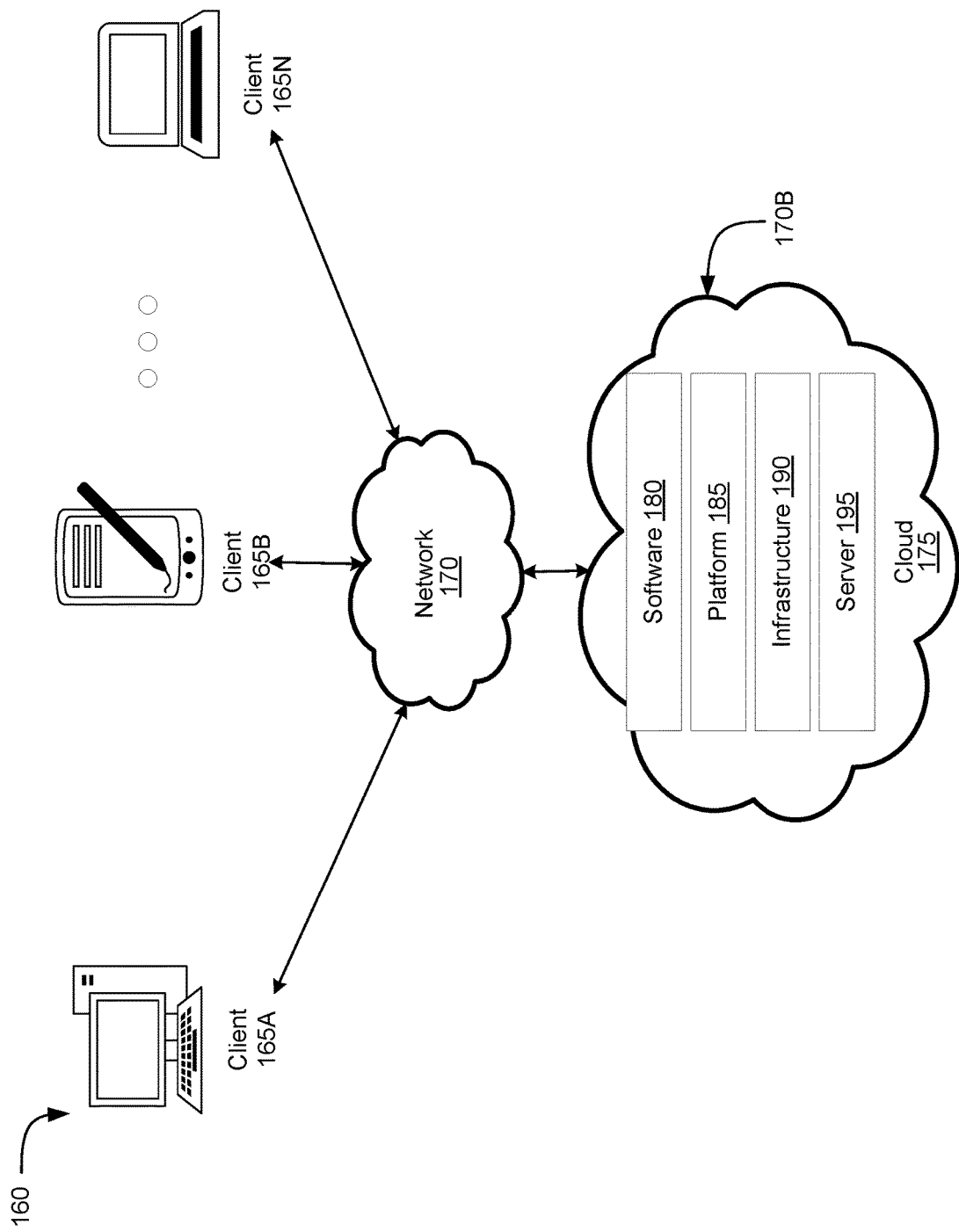
FIG. 1B is a block diagram depicting a computing environment comprising client device in communication with cloud service providers.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods of secondary authentication.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
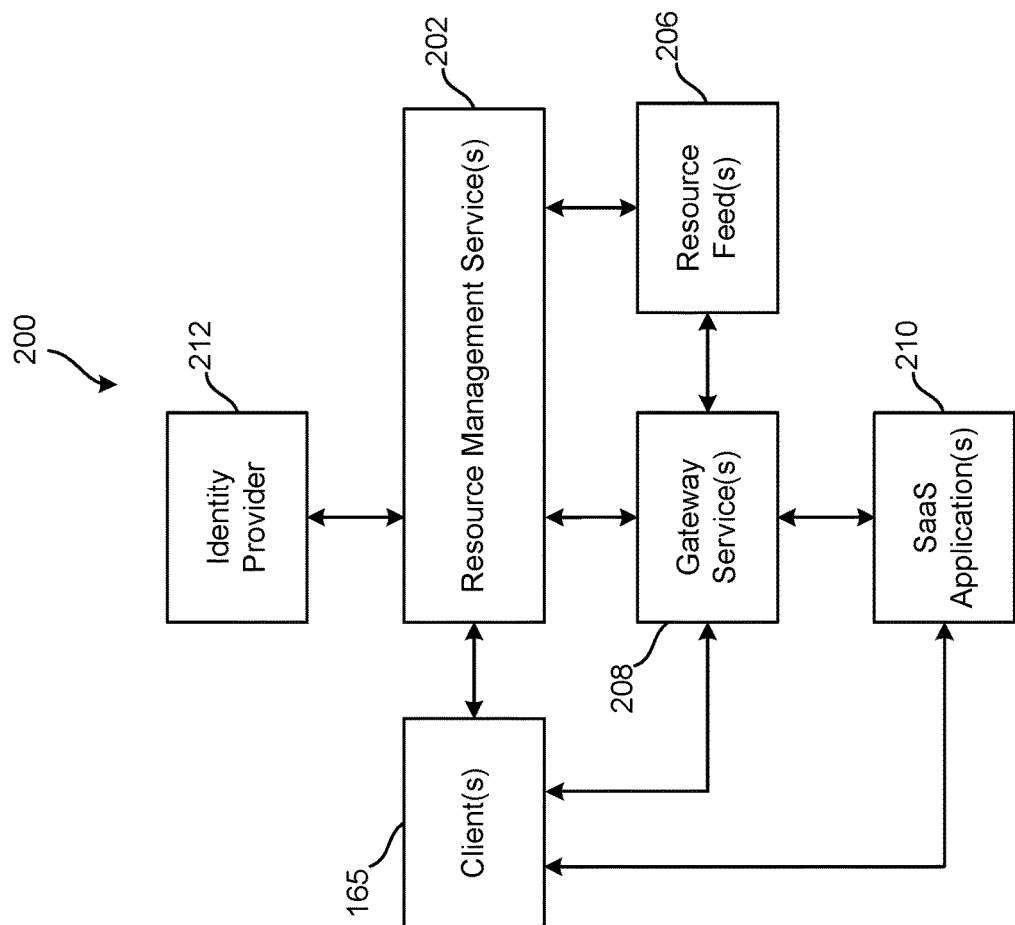
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
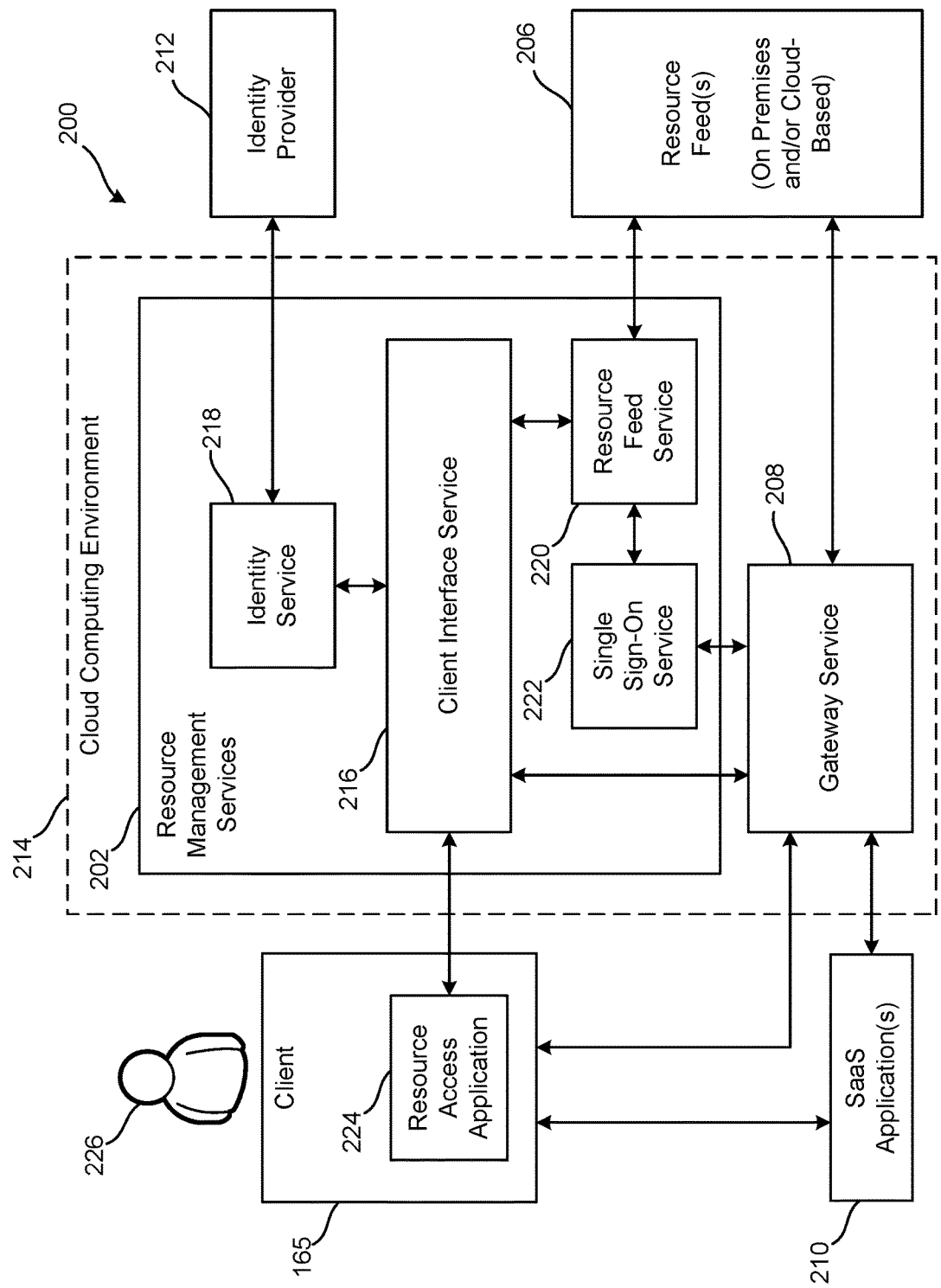
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more interne enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
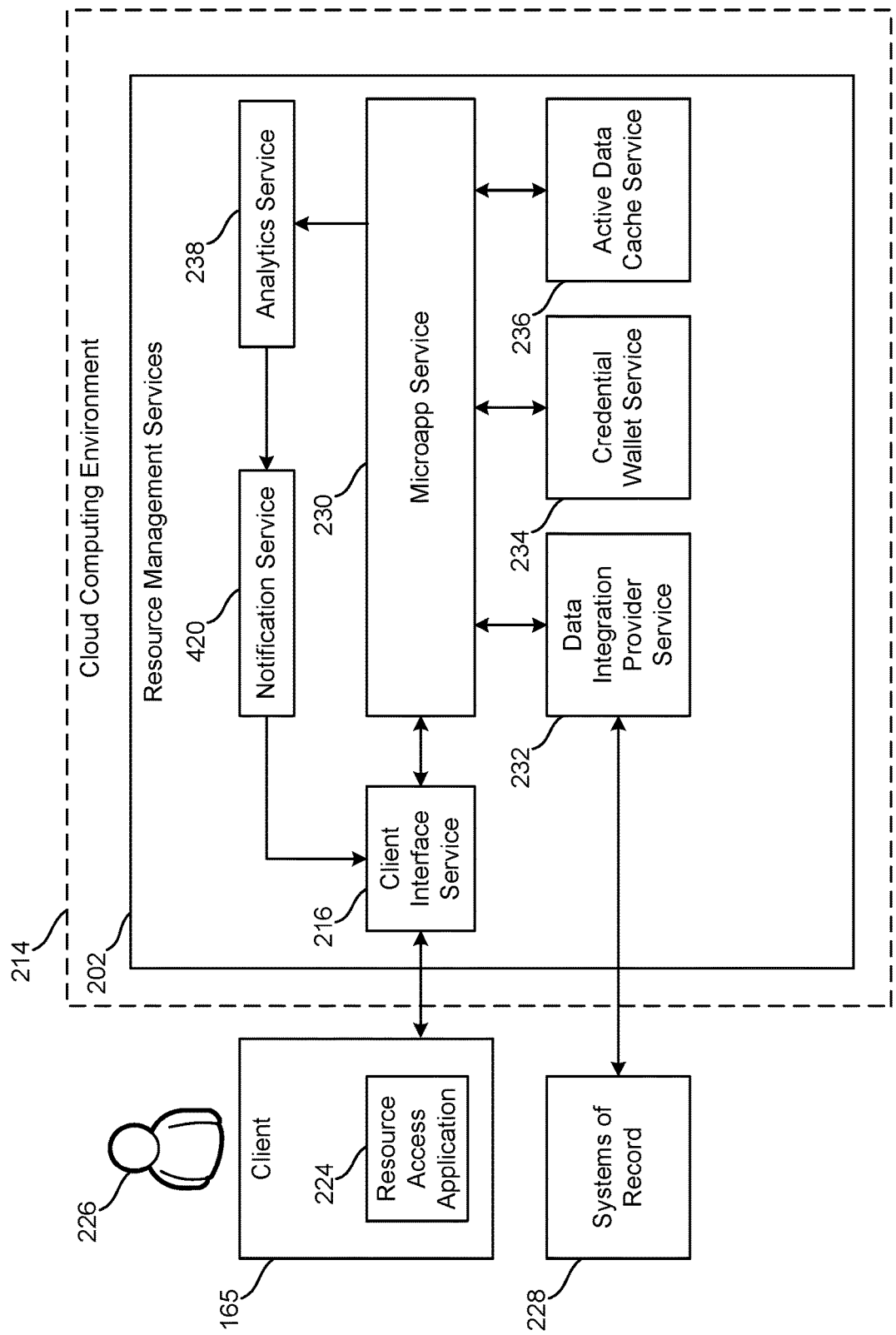
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6 ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oath2 token. The data integration provider service 232 may then decrypt the Oath2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they are looking for.

C. Systems and Methods for Secondary Authentication

Figure 3:
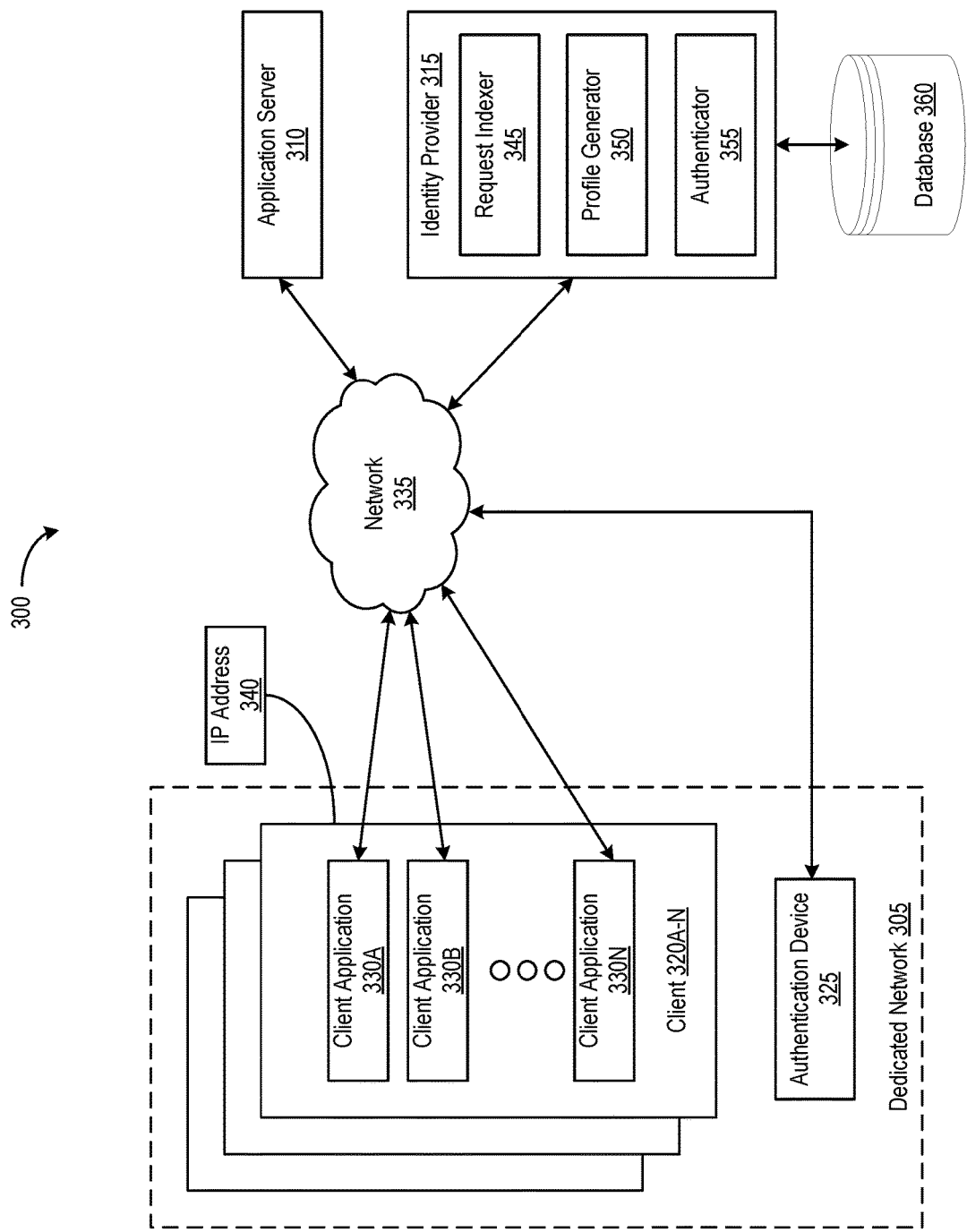
FIG. 3 is a block diagram of a system for initiating one-factor or multi-factor authentication, in accordance with an illustrative embodiment.

Referring now to FIG. 3, depicted is a block diagram of a system 300 for secondary authentication. In brief overview, the system 300 can include at least one dedicated network 305, at least one application server 310, at least one identity provider 315, at least one database 360, and at least one network 335, among others. The dedicated network 305 can include or be connected to by one or more clients 320A-N (sometimes generally referred to as client(s) 320, client device(s), or user device(s)) and at least one authentication device 325 (e.g., registered device, a second device, or an MFA device of a user), among others. The identity provider 315 may include at least one request indexer 345, at least one profile generator 350, at least one authenticator 355, and at least one database 360, among others. Individual clients 320 may include one or more client applications 330A-N (hereinafter generally referred to as client application 330). One or more components, elements, or entities (e.g., application server 310, identity provider 315, clients 320, the authentication device 325, or database 360) of the system 300 can communicate or transfer data with other components of the system 300 via the network 335.

Each of the above-mentioned elements or entities can be implemented in hardware, or a combination of hardware and software, in one or more embodiments. Each component of the system 300 may be implemented using hardware or a combination of hardware or software detailed above in connection with FIGS. 1A and 1B. For instance, each of these elements or entities can include any application, program, library, script, task, service, process or any type and form of executable instructions executing on hardware of the system 300, such as the application server 310, the identity provider 315, the clients 320, the authentication device 325, or the database 360. The hardware can include circuitry such as one or more processors and/or memory in one or more embodiments.

The network 335 can include computer networks such as the Internet, local, wide, metro or other area networks, intranets, satellite networks, other computer networks such as voice or data mobile phone communication networks, and combinations thereof. The components of the system 300 can communicate with each other via the network 335, for example, the clients can communicate with the application server 310, the identity provider 315, or the authentication device 325. The network 335 may be any form of computer network that can relay information between the one or more components of the system 300. The network 335 can relay information between the one or more clients 320 and one or more information sources, such as web servers or external databases, amongst others. In some implementations, the network 335 may include the Internet and/or other types of data networks, such as a local area network (LAN), a wide area network (WAN), a cellular network, a satellite network, or other types of data networks.

The network 335 may also include any number of computing devices (e.g., computers, servers, routers, network switches, etc.) that are configured to receive and/or transmit data within the network 335. The network 335 may further include any number of hardwired and/or wireless connections. Any or all of the computing devices described herein (e.g., dedicated network 305, application server 310, identity provider 315, clients 320, the authentication device 325, etc.) may communicate wirelessly (e.g., via WiFi, cellular, radio, etc.) with a transceiver that is hardwired (e.g., via a fiber optic cable, a CAT5 cable, etc.) to other computing devices in the network 335. Any or all of the computing devices described herein (e.g., dedicated network 305, application server 310, identity provider 315, clients 320, the authentication device 325, etc.) may also communicate wirelessly with the computing devices of the network 335 via a proxy device (e.g., a router, network switch, or gateway). In some implementations, the network 335 can be similar to or can include the network 170 or a computer network accessible to the computer 100 described herein above in conjunction with FIG. 1A or 1B.

The dedicated network 305 can be implemented using hardware or software components. The dedicated network 305 can be or include at least one hardware component (e.g., router, modem, network interface card, switch, network device, network hardware, optic cable, LAN, WAN, satellite network, amongst other types of network devices) dedicated to or managing a group of registered devices to establish connections to the network 335. The dedicated network 305 can be referred to as a home network (e.g., managed by a router), a private network (e.g., Intranet), or an office network (e.g., enterprise network), among others. The dedicated network 305 can be a local network connecting one or more devices (e.g., with access to the local network via sign-in process) to the network 335. The dedicated network 305 can provide clients 320, the authentication device 325, or other devices (e.g., devices registered or connected to the dedicated network 305) with connection to the network 335. Connection to the network 335 can enable the devices to share data or establish communication channels with other components of the system 300, e.g., the application server 310, the identity provider 315, or the database 360.

The dedicated network 305 can maintain an internet protocol ("IP") address 340 from the connected one or more devices (e.g., clients 320 or authentication device 325) when receiving a data transmission from individual devices. The IP address 340 received in the header of data packets from devices can be a source IP address unique between individual devices. In some cases, the IP address 340 can be associated with the dedicated network 305. The IP address 340 of the dedicated network 305 can be unique from IP addresses of other networks (e.g., other dedicated networks from other homes or offices). Devices (e.g., the client 320 or the authentication device 325) connected to the dedicated network 305 can transmit information in a form of data packets or data packages to other components of the system 300. The data packets can include the IP address 340 when transmitted to other components of the system 300 (e.g., a header of the data packet, in addition to a destination IP address to determine whether the package needs to be sent). The IP address 340 can be a source IP address indicating which local network (e.g., dedicated network 305, among other networks) data packets are transmitted from.

In some implementations, the dedicated network 305 can be, refer to, or include an access point one or more devices (e.g., clients 320 and the authentication device 325) are connected to. The IP address 340 can be associated with the access point or a location of the devices connected to the access point. For example, one or more clients 320 can transmit data packets to the network 335 via the access point. The access point can forward data packets from the client device to the network 335, where the data packets can include the IP address 340. If the address of the data packet is designated to the identity provider 315, the identity provider 315 can trace the IP address 340 to the dedicated network 305 the data packets are from. In this case, the location of the dedicated network 305 indicated by the IP address 340 can correspond to the location of the devices connected to the access point of the dedicated network 305. Therefore, the IP address 340 can be associated with the access point, dedicated network 305 (e.g., home or remote office), or the originating computing device that transmitted the request to authenticate the user, for example.

In some implementations, the IP address 340 can be, or include, a local IP address for at least one component of the system 300 (e.g., identity provider 315) to identify the IP address of individual devices connected to the access point or within the dedicated network 305. The IP address 340 can represent one or more IP addresses of the respective one or more clients 320 or a source IP address (e.g., indicating the dedicated network 305, an access point, or a location) one or more clients 320 transmit data packets from. Using the IP address 340, the dedicated network 305 can be analyzed by at least one component (e.g., identity provider 315) of the system 300 to determine whether the dedicated network 305 is privately use by a client 320 or used by various clients 320 to access one or more applications using different accounts, such as to determine whether to minimize MFA for subsequent authentication.

In some implementations, the dedicated network 305 can be or include a network device that provides or otherwise enables connections between devices of the dedicated network 305 to network 335. The dedicated network 305 can receive a request from a device (e.g., client 320 or authentication device 325) to communicate or connect to the dedicated network 305 for accessing the network connection. The dedicated network 305 can transmit request credentials from the device. The dedicated network 305 can verify the credentials of the device attempting to access the network. If the credentials matched at least one of the credential information on the record of authorized devices, the dedicated network 305 can provide access to the device. Otherwise, the dedicated network 305 can reject or block device's attempt to access the dedicated network 305.

Individual clients 320 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client 320 can include one or more computing devices or servers that can perform various functions as described herein. The one or more clients 320 can include any or all of the components and perform any or all of the functions of the computer 100 or the client or client devices 165 described herein in conjunction with FIGS. 1A-2C. The clients 320 can be, or can be similar to, the client devices 165 described herein above in conjunction with FIGS. 1A-2C.

Clients 320 can include, but is not limited to, a television device, a mobile device, smart phone, personal computer, a laptop, a gaming device, a kiosk, or any other type of computing device. Each client 320 can be implemented using hardware or a combination of software and hardware. Client 320 can include a display device that can provide visual information, such as information presented as a result of executing instructions stored in the memory of the client 320. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces to various regions of the display in accordance with the implementations described herein. In some implementations, the display device can include interactive elements, such as capacitive or resistive touch sensors. Thus, the display device can be an interactive display (e.g., a touchscreen, a display, etc.), and can include one or more input/output (I/O) devices or interfaces.

Clients 320 can further include or be in communication with (e.g., via a communications bus coupled to the processors of the clients 320, etc.) one or more input devices, such as a mouse, a keyboard, or digital keypad, among others. The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the clients 320. The interactions can result in interaction data, which can be stored and transmitted by the processing circuitry of the client 320 to other computing devices, such as those in communication with the clients 320. The interaction data can include, for example, interaction coordinates, an interaction type (e.g., click, swipe, scroll, tap, etc.), and an indication of an actionable object with which the interaction occurred. Thus, each client 320 can enable a user to interact with and/or select one or more actionable objects presented as part of graphical user interfaces to carry out various functionalities as described herein.

The clients 320 can connect to a dedicated network 305 (e.g., if authorized or if valid credentials are provided). By connecting to the dedicated network 305, clients 320 can transmit data to the network 335 with IP address 340 associated with the dedicated network 305 (e.g., access point forwarding data packets to the network 335 or location of the device). Clients 320 can execute one or more client applications 330A-N (sometimes generally referred to as application(s) 330 or client application(s) 330). The applications 330 can include at least a web browser, local application, among other client-side applications. The applications 330 can be installed on the clients 320 or on a server, such that clients 320 can transmit a request to access the application to the server (e.g., application server 310). Applications executing on the server or remote from the clients 320 can be referred to as network application, which the clients 320 can access remotely or virtually via a remote desktop.

Clients 320 can transmit device information or user information to the application server 310 or the identity provider 315. The device information can include, for example, at least device location, IP address (e.g., IP address 340), operating system ("OS") of device, cache, hardware information, etc.).

In some implementations, clients 320 may move from the location of the dedicated network 305 (e.g., moved from a home to the office, connecting to the office network). One or more clients 320 may connect to a different network. As a result, when transmitting data on a different network, the data packets transmitted by the one or more clients 320 may include a different source IP address from IP address 340, for example. In some implementations, an IP address (e.g., IP address 340) can indicate a general area or location of the client 320 connected to a network device.

The application server 310 can be as a Software-as-a-Service ("SaaS") application server or a network application server that hosts remote applications. The application server 310 can include resources for executing one or more applications, such as SaaS applications, network applications, or other applications within a list of available resources maintained by the application server 310. The application server 310 can include one or more features or functionalities of at least resource management services 202 or other components within the cloud computing environment 214 in conjunction with at least FIGS. 2A-C. For example, the application server 310 can receive a request from one or more clients 320 to access a resource (e.g., an application or a page within an application). The application server 310 may establish trust with the identity provider 315, such that the identity provider 315 can receive requests or instructions directly from the client 320 or client application 330.

The database 360 can include a data repository, a remote database, a remote storage device, or an identity provider storage device, for example. The database 360 can include information stored by the identity provider 315. The database 360 can be, or include, various storage devices capable of storing information from one or more components of the system 300, such as data from the clients 320, the authentication device 325, the application server 310, or among other devices. The database 360 can include subsets of storage devices or different compartments of storage space (e.g., can be dynamically adjusted based on available space) configured to store different types of data from one or more components of the system 300.

The database 360 can store data from clients 320. Data from clients 320 can include at least client device information (e.g., hardware information, IP address 340 used to transmit data device location, etc.) and client application data (e.g., cookies, event data, historical interaction data, historical query input, etc.) associated with each client application 330. The database 360 can store data from authentication device 325, such as location data, network connection data, or other information similar to the clients 320. The database 360 can store data from the application server 310, such as timestamps of one or more requests are received from one or more clients 320, one or more applications being requested by the clients 320, IP address 340 used to transmit the request, etc. The database 360 can store data from the identity provider 315, such as timestamps of receiving requests for accessing applications from each client 320, timestamps of receiving credentials in response to an authentication request transmitted to each client 320, timestamps authorizing a user to access the requested application (e.g., after one or more users successfully completed MFA), other timestamps when receiving a request or transmitting authentication, or user profile generated by the identity provider 315 based on user pattern (e.g., information from client 320 when attempting to access an application). The database 360 can store other data for use by the identity provider 315 as discussed herein.

The authentication device 325 can include hardware or software components similar to one or more clients 320. The authentication device 325 can be one of the client devices. For example, the authentication device 325 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The authentication device 325 can include one or more computing devices or servers that can perform various functions as described herein. The authentication device 325 can include any or all of the components and perform any or all of the functions of the computer 100 or the client or client devices 165 described herein in conjunction with FIGS. 1A-2C. The authentication device 325 can be, or can be similar to, the client devices 165 described herein above in conjunction with FIGS. 1A-2C.

The authentication device 325 can include, but is not limited to, a television device, a mobile device, smart phone, personal computer, a laptop, a gaming device, a kiosk, or any other type of computing device. The authentication device 325 can be implemented using hardware or a combination of software and hardware. The authentication device 325 can include a display device that can provide visual information, such as information presented as a result of executing instructions stored in the memory of the authentication device 325. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces to various regions of the display in accordance with the implementations described herein. In some implementations, the display device can include interactive elements, such as capacitive or resistive touch sensors. Thus, the display device can be an interactive display (e.g., a touch-screen, a display, etc.), and can include one or more input/output (I/O) devices or interfaces.

The authentication device 325 can further include or be in communication with (e.g., via a communications bus coupled to the processors of the authentication device 325, etc.) one or more input devices, such as a mouse, a keyboard, or digital keypad, among others. The display can be used to present one or more applications as described herein, such as web browsers or native applications. The display can include a border region (e.g., side border, top border, bottom border). The inputs received via the input/output devices (e.g., touch-screen, mouse, keyboard, etc.) can be detected by one or more event listeners, and indicate interactions with one or more user interface elements presented on the display device of the authentication device 325. The interactions can result in interaction data, which can be stored and transmitted by the processing circuitry of the authentication device 325 to other computing devices, such as those in communication with the authentication device 325. The interaction data can include, for example, interaction coordinates, an interaction type (e.g., click, swipe, scroll, tap, etc.), and an indication of an actionable object with which the interaction occurred. Thus, the authentication device 325 can enable a user to interact with and/or select one or more actionable objects presented as part of graphical user interfaces to carry out various functionalities as described herein.

The authentication device 325 can be used to perform features and functionalities separate from or in combination with at least one client 320. The authentication device 325 can be on the dedicated network 305 similar to the client 320 (e.g., as depicted). The authentication device 325 can connect to the dedicated network 305 using any type of network connection, such as WiFi connection, cable access, among others. The authentication device 325 can transmit data packets from the same IP address (e.g., IP address 340) as the client 320. The IP address 340 can be used by the IDP 315 to determine the location of the authentication device 325.

In some implementations, the authentication device 325 may be external to the dedicated network 305 and may transmit data packets from an IP address different from that of the client 320. For example, the authentication device 325 can connect to the network 335 via one of hotspot connection, mobile connection, or another network, among others, separate from the dedicated network 305. In this case, the authentication device 325 may not transmit the same IP address (e.g., IP address 340) as the client 320. The location of the authentication device 325 can be determined based on the global positioning system ("GPS") data transmitted to the IDP 315, for example.

The authentication device 325 can be registered or configured to receive MFA notification or prompt from the identity provider 315. The authentication device 325 can receive an input from the user indicating a confirmation or a rejection to the MFA notification received from the identity provider 315. In some implementations, the authentication device 325 may be in communication with a client 320. In some other implementations, the authentication device 325 may not be in communication with the client 320.

The client applications 330 of the client 320 may include at least one of a local application, a network application, web application, embedded browser, among others. The client applications 330 can be installed on clients 320 via downloading or retrieving resources from a server (e.g., application server 310). For example, a client 320 can launch a browser application (e.g., pre-installed on a computing device) to connect to a server having resources for certain applications, such as via an installation page. The client 320 can transmit an instruction to a server to download an application, such as by interacting with a download interactive element associated with the application. The application (e.g., data of client application 330) can subsequently be downloaded or fetched from the server (e.g., application server 310) to store or be installed on the client 320. The client application 330 can be launched via an executable file, which a user can interact with on the client 320. To execute or perform features and functionalities of the client application 330 (e.g., network application, web application, etc.) where resources are stored on the server (e.g., application server 310), the client 320 can access the application server 310 via the client application 330 to retrieve at least a subset of the resources.

For example, to access the resources of the client application 330, the application server 310 may request the client 320 to provide credentials for verifying the user identity. Accordingly, after verifying the credentials, among other security checks, the client application 330 can be executed or one or more features can be enabled in the client application 330. In some implementations, the client application 330 can be launched after confirming the user identity or credentials. In some implementations, the client application 330 can be accessed without authentication if the application server 310 does not require authentication or if client 320 has authenticated within a time period. In some implementations, the resources of an application may be stored locally on the client 320 (e.g., local application), such that the application can be launched and executed using resources stored on the client 320 without accessing a server.

To access the application 330 (or features of the application 330), at least one client 320 can provide, or transmit a request to authenticate the user to access to the application server 310 or the identity provider 315. In some implementations, the client 320 can generate a request to authenticate the user to send, to the application server 310 or to the identity provider. For example, the request may be generated in response to a user of the client 320 opening the client application 330 via the operating system on the client 320. The request to authenticate may identify or include the IP address 340 for the client 320. For example, the request may include the IP address 340 as the source address and another network address for the application server 310 or the identity provider 315. The IP address 340 may be defined relative to the dedicated network 305 as discussed above. In addition, the request to authenticate may identify or include an account identifier corresponding to the user, a timestamp corresponding to a time of generation of the request, and a location corresponding to a geographic location of the dedicated network 305 or the client 320.

In some implementations, the client 320 can include application context (e.g., a cookie or other identifier) in the request to authenticate the user. The application context may be particular to the client application 330 that the user is attempting to access. Context of individual client applications 330 may not be shared with other applications. For example, client application 330A can include or be associated with a first cookie, and client application 330B can include or be associated with a second cookie. The first cookie and the second cookie may not be shared between the two client applications 330A-B, nor can the cookie be shared with other applications, such as client application 330C. The context of individual client applications 330 may be honored or maintain on a per-application basis in accordance with operating system security policies. Clients 320 can transmit cookies from individual client applications 330 to the identity provider 315. Since the context of the applications 330 are not shared, other information from the client 320 (e.g., IP address 340, among other data of the client 320) can be used to determine the risk associated with the authentication attempt, whether MFA should be used, or would one-factor authentication be sufficient. Upon identifying, the client 320 can insert or include the application context into the request.

When the request is directed to the application server 310, the application server 310 can receive the request to authenticate the user of the client 320. The application server 310 can receive the request to access or authenticate the user in response to the user initiating an executable file or other launch option associated with an application. The application server 310 can redirect the clients 320 (e.g., web browser executing on the clients 320) to the identity provider 315, such as redirecting the request to access an application from the client 320 to the identity provider 315. The application server 310 can also forward the request from the client 320 to the identity provider 315. When the request is directed to the identity provider 315, The identity provider 315 can receive requests directly from the clients 320 (e.g., from one or more client applications 330).

The request indexer 345 can receive the request from the client 320 to authenticate the user. The request indexer 345 can receive this request directly from the client 320 or from the application server 310 forwarding the request. The request indexer 345 can parse the request to identify the timestamp (e.g., when the request was sent from the client 320 or received by the request indexer 345), the IP address 340 (e.g., a network address from which the request is transmitted from), the account identifier for the user, the location of the client 320 transmitting the request, and the application context (e.g., identifier for cookie associated with the client application 330), among other information. The parsed information can be used by other components of the identity provider 315 (e.g., profile generator 350 or authenticator 355), such as to generate or update a user profile or determine whether to initiate a one-factor authentication or MFA.

In some implementations, the request indexer 345 can handle various requests from clients 320 concurrently or simultaneously. The request indexer 345 can process the request from the clients 320 to determine a subsequent action to perform, such as transmitting a response to the request, storing the request as part of the user profile, etc. Based on the type of request, the request indexer 345 can index between at least the profile generator 350 and/or the authenticator 355. For example, with an access request from a client 320, the request indexer 345 can relay or provide information related to the request to the profile generator 350 (e.g., timestamp of the request, IP address of the client 320 requesting access, or location of the client 320) and to the authenticator 355 (e.g., type of access request, which application is being requested, etc.). Information relayed to components of the identity provider 315 can be interchangeable or shared amongst the components to minimize the use of MFA in low-risk authentication attempts.

The profile generator 350 can generate and maintain user profiles (sometimes referred to as user context or user pattern) for the client 320. The profile generator 350 can monitor information received from clients 320 with respect to the user accounts accessed from the clients 320. For example, the profile generator 350 can identify the consistency of users' IP address 340 used to access one or more client applications 330 managed by the identity provider 315. The identification of the IP address 340 may be independent of the application context (e.g., cookie) included in the request. The IP address 340 can indicate the network users are using to access the resources, such as home network, office network, public network, etc. The consistency can be based on the number of times (e.g., per day, week, month, etc.) the client 320 access the one or more applications 330 with the IP address 340 compared to other IP addresses used to access the one or more applications 330. For example, if the client 320 accesses one or more application 330 with the IP address 340 for 10 times and with other IP addresses different from the IP address 340 for 2 times, the profile generator 350 can determine the consistency of 10 out of 12 (e.g., 10/12), 10:2, or 83.33% consistency. Based on the consistency, the profile generator 350 may determine (at least in part) that the risk level is low, where the level of risk can depend on other conditions indicated in the user profile. For example, the profile generator 350 can compare the consistency level to a predetermined threshold. For this particular condition, which can be combined with other conditions to determine a final risk level, a low-risk level can be set at 80% or above, a medium risk level can be set at 50% up to 80%, and a high-risk level can be set at below 50% consistency for an IP address.

Upon receipt of the request, the profile generator 350 can determine whether the previous request to authenticate the user originated from the IP address 340 and was approved. In some implementations, the profile generator 350 can use the user profile for the user of the client 320 from which the request originates to perform the determination. For example, a user profile associated with the client 320, or the account the client 320 is attempting to access, can indicate that the user was previously authorized or approved for access by the authenticator 355 from the IP address 340. If the current request to authenticate is within a time period (e.g., 30 minutes, 1 hour, 2 hours, etc.), the profile generator 350 can determine that the client 320 satisfy this condition.

The profile generator 350 can determine whether the IP address 340 from the client 320 is consistent. For example, the profile generator 350 can monitor the activities of the user, such as one or more IP addresses from which the client 320 communicates with the application server 310 or other components of the system 300. The communication can refer to the transmission of data packets. The profile generator 350 can monitor historical requests to authenticate from the client 320 (e.g., information from the user profile) to determine at least one of i) how many times per time period (e.g., a day or a week) the client 320 access applications 330 from the IP address 340 compared to from other IP addresses, ii) how many times from the same IP address before switching to a different IP address, etc. Based on this determination and a setting (e.g., a ratio that indicates the IP address is consistent) from an administrator of the identity provider 315, the profile generator 350 can determine whether the client 320 satisfy this condition.

The profile generator 350 can determine whether other users have previously accessed the client application 330 from the IP address 340. The client application 330 can be identified via the application context included in the request. If at least one other user has previously accessed the application 330 from the IP address 340, such as within a time period (e.g., 1 week, 2 weeks, 1 month, etc.) or a number of times the application 330 has been accessed (e.g., 10 times, 20 times, etc.), the profile generator 350 can determine that the condition is not satisfied. Otherwise, the profile generator 350 can determine that this condition is satisfied by the client 320. In some implementations, the IP address 340 can be associated with a location of the client 320 or the access point (e.g., connected by the client 320). The profile generator 350 can determine if other users access the application 330 based on the location or the access point connected to by the other users, e.g., in addition to or in place of the IP address 340.

The profile generator 350 can determine whether the request is within a pattern established in the user profile. For example, after the profile generator 350 monitor a range or general time period that the user often access the application 330 (e.g., an average within a span of a week, a month, etc.), the profile generator 350 can establish an access time pattern for the user. Other user patterns can be monitored, recorded, and used to update or generate the user profile. If the request to authenticate from the client 320 falls within the established time pattern, the profile generator 350 can determine that this condition is satisfied, and not satisfied otherwise. A margin for error can be established for the range, such as if the user often accesses the application 330 between 8 AM to 9 AM, a margin can be included in the established pattern, such as 7:45 AM to 9:15 AM.

The profile generator 350 can determine whether the authentication device 325 is at a known location or a location similar to the client 320. For example, the profile generator 350 can receive data packets transmitted from the authentication device 325 reporting at least one of the IP address (connected to by the authentication device, which may or may not be different from IP address 340), the location, or the access point the authentication device 325 is connected to. If same as the client 320, such as at least one of the same IP address, the location, or the connected access point, the profile generator 350 can determine that the condition is satisfied. Otherwise, if not same as the client 320, the profile generator 350 can determine that the condition is not satisfied. In some implementations, the profile generator 350 can use the information on whether the one or more conditions is satisfied to generate a risk level for the user profile when transmitting data packets from one or more IP addresses.

In some implementations, the profile generator 350 can determine whether multiple IP addresses are consistent or used consistently by the client 320. For example, the profile generator 350 can identify a count threshold (e.g., retrieved from the database 360) for the number of times the client 320 utilized IP addresses. If the count threshold is 3 (e.g., access 3 applications using same IP addresses per day), and the profile generator 350 determines that for both a first IP address and a second IP address, the client 320 access the one or more applications 330 greater than 3 times, the profile generator 350 can update the user profile indicating multiple IP addresses with low-risk or high-consistency. In some implementations, the number of times can be sequential (e.g., consecutively accessing applications 330 within the same IP address 340 or tracking the IP addresses) or non-sequential (e.g., accumulated access to applications 330 by the user within a day or counting the IP addresses). For example, to classify the user of an IP address as consistent, the profile generator 350 can determine that the client 320 access the applications 330 beyond a threshold (e.g., 3 or 5 times) using the same IP address before using other IP addresses. In another example, to classify the user of an IP address as consistent, the profile generator 350 can determine that the client 320, within a timeframe set by the administrator of the identity provider 315 (e.g., 5 hours, 10 hours, 1 day, etc.), access the applications 330 using the IP address for more than a predetermined number of times within the set timeframe.

The profile generator 350 can determine whether the client 320 has previously been authenticated within a period of time (e.g., a predetermined time) of the pending or current authentication attempt with the IP address 340. The time can be, for example, within 15 minutes, 30 minutes, 1 hour, etc. This time can be configured by the administrator of the identity provider 315. In some implementations, a request to access an application 330 received after the time can cause the authenticator 355 to use MFA. If within the time, the authenticator 355 can take into account other conditions.

The profile generator 350 can determine whether no other users access (or attempt to access) one or more applications 330 via the same IP address 340. If no other users have accessed the application 330 using the IP address 340, the profile generator 350 can lower the risk level. Otherwise, if other users have accessed the applications 330 using the same IP address 340 as the client 320, depending on the frequency of access by other users, the profile generator 350 can determine that the associated IP address is high-risk when authenticating the client 320. For example, the profile generator 350 can determine that no other users access one or more applications 330 within multiple weeks or at least one month. To determine, the profile generator 350 may identify a user access log associated with the one or more applications 330. The use access log can be stored in the database 360 or a data storage of the application server 310 managing the one or more applications 330. The user access log can indicate at least one or more clients 320 requesting access, user accounts being accessed, timestamps of receiving the access request, timestamps of granting/rejecting access, updates to the application 330, among other information indicating interaction with the associated one or more applications 330.

Based on the IP address, The profile generator 350 can determine whether the risk is low for the client 320 to access the application 330. However, if other users access the applications 330 one or more times per week, the risk can be classified as high-level, at least for this condition. In score settings, where the risk level used to determine whether to minimize MFA, the profile generator 350 can increase the score (e.g., lower risk) if no other users access the application 330 from the IP address and decrease (in some cases more than the increase) if at least one user accesses the application 330 from the IP address to access one or more applications 330.

The profile generator 350 can determine or record a user pattern for when clients 320 access the one or more applications 330. For example, the profile generator 350 can determine, based on historical access time of the client 320, that the client 320 often access (or attempt to access) at least one application 330 every day from 8:00 AM to 9:00 AM. The profile generator 350 can determine that the timeframe between 8:00 AM to 9:00 AM for the client 320 to access one or more applications 330 with the IP address 340 can be a safe, low-risk scenario. The profile generator 350 may not determine that the risk is low if attempted to access at other timeframes, such as 10:00 AM to 11:00 PM. In some implementations, the profile generator 350 can indicate that the profile is at a medium to high risk if accessed at off-time. In some implementations, the user pattern may not be consistent. The profile generator 350 may not weigh this condition as heavily as others when determining the risk of the authentication attempt.

The profile generator 350 can monitor the location of the authentication device 325. The location of the authentication device 325 can be reported to the identity provider 315. The profile generator 350 can compare the location of the authentication device 325 compared to the historical locations of the authentication device 325. Based on the consistency, and whether the authentication device 325 is in the proximity of the client 320 (e.g., at home or at the office), the profile generator 350 can determine the risk level or risk score for this condition accordingly. For example, if the authentication device 325 is at a location common to the device, such as in the office, private studio, home, etc., the profile generator 350 can determine a low-risk for this condition (e.g., decrease risk level). However, if the authentication device 325 is at a location not previously recorded or often visited, the risk can increase for this condition.

The profile generator 350 can use information from different clients 320 and conditions discussed above to generate a user profile for individual clients 320 or user. The profile generator 350 can include a risk level corresponding to individual user profiles. The profile generator 350 can inspect or identify whether the client 320 satisfies the conditions discussed above to determine or update the risk level accordingly. The risk level can be represented as a score, such that satisfying consistently satisfying all conditions for accessing various applications 330 can increase the score for the user profile by a predetermined amount (e.g., 5 out of 100 for each verified access, among other metrics for increasing the score). In some implementations, when at least one condition is not satisfied when attempting to authenticate, the profile generator 350 may reduce the score by a predetermined amount (e.g., 10 out of 100 scores for breaking one condition, 25 out of 100 scores for breaking multiple conditions, among other metrics to reducing the score).

The risk level can include various categories, such as low risk, medium risk, or high risk. The profile generator 350 can determine the risk level for a respective client 320, user account, or IP address 340 from which the one or more applications 330 are accessed by the user. For example, the profile generator 350 can determine that the risk level is low for the user to access the application 330 at a particular IP address (e.g., IP address 340) the user satisfying various conditions indicated in the user profile. The profile generator 350 can determine a low risk for an authentication attempt based on the client 320 satisfying the various conditions discussed herein, such as time since previously authenticated or verified, IP address consistency, the sole user accessing one or more applications 330 in the dedicated network 305 (e.g., having the IP address 340, following the pattern of the user profile, and the location of the authentication device 325. If any of the condition is not satisfied, the profile generator 350 can classify the authentication attempt as at least medium risk, which the identity provider 315 may use MFA. However, if all conditions are satisfied, the profile generator 350 can determine that the risk is low for the pending authentication attempt. With low risk, the identity provider 315 can determine to use one-factor authentication, rather than MFA.

In some implementations, the profile generator 350 can update user profiles responsive to receiving new information from users accessing one or more applications 330 or logging into their respective user accounts. In some cases, the profile generator 350 can update user profiles based on an absence of user activities. For example, the profile generator 350 can gradually or periodically (e.g., every day, week, month, etc.) increase the security level (or risk level) based on an absence of user activities. Inactivity by the users can indicate that the user lost a device used to access the one or more applications 330, lost a corresponding authentication device, or other scenarios, where a sign-in attempt by a user after a prolonged period may indicate at least a medium to high-risk scenario, for example.

Based on the determinations by the profile generator 350, the authenticator 355 can determine whether to initiate one-factor authentication or the multi-factor authentication. In some implementations, the authenticator 355 can use any combination of the determinations in selecting the one-factor authentication or the multi-factor authentication. When the risk-level is determined as low (e.g., the previous request was successful), the authenticator 355 can select the one-factor authentication instead of the multi-factor authentication. On the other hand, when the risk-level is determined as high (e.g., the previous request was not successful), the authenticator 355 can select the multi-factor authentication.

When the determination that the previous request was successful, the authenticator 355 can initiate one-factor or reduced factor authentication. In some implementations, the authenticator 355 can initiate the one-factor authentication upon determining that the risk-level of the user of the client 320 is low. Initiating one-factor authentication can refer to using the one-factor authentication technique. For example, the identity provider 315 can transmit a validation request to the application server 310, where the application server 310 can forward the validation request to the client 320 via the application 330. The validation request can prompt the client 320 to provide credentials, such that providing a valid credentials can enable the client 320 the gain access to the application without MFA when initiating the one-factor authentication. Authentication device 325 may not be used in this case. In some implementations, the identity provider 315 can transmit the validation request or receive credentials directly to or from the client 320 via the application 330, for example.

In performing the one-factor authentication, the identity provider 315 can transmit a request for credentials (e.g., validation request) to the clients 320 via the client application 330, prompting the client 320 to provide credentials for verification. The identity provider 315 can transmit the validation request responsive to receiving the access/authenticate request from the client application 330. The client 320 (or the client application 330) can receive the validation request from the identity provider 315. After receiving the validation request, the client 320 can prompt or notify the user to enter credentials or information for accessing the application.

Upon receipt of the request for credentials, the client 320 can receive user input for responding to this request. The user input can include credentials of the user, passcode, among other answers to at least one security question, for example. The request for credentials can be presented via a user interface of a client application 330, e.g., as a pop-up box, notification, prompt, or content on the user interface. For example, the client application 330 of the client 320 can include respective context or information associated with the client application 330, such as cookies or login settings (e.g., "remember me," "remember device," "stay signed in," or "do not ask again").

The identity provider 315 can receive credential information from the clients 320 via the client application 330, subsequent to the identity provider 315 transmitting the validation request. The identity provider 315 can determine the credentials are valid or if the client 320 should be given access to the application that was requested. The identity provider 315 can perform any validation techniques, such as comparing the credentials to a list of credentials indicating users with access to the application, among other validation procedures. If credentials are valid, the identity provider 315 can transmit a response (e.g., either approving or rejecting access) to the client application 330, the client 320, or in some cases, to the application server 310 to forward the response to the application 330 or the client 320. If credentials are not valid, the identity provider 315 may request for the user to reattempt or provide second credentials.

In contrast, when the determination is that the previous request was not approved, the authenticator 355 can initiate multi-factor authentication. In some implementations, the authenticator 355 can initiate the multi-factor authentication in response to determining that the risk level of the user of the client 320 is high. The multi-factor authentication can refer to any authentication technique prompting the user to enter multiple pieces of data or evidence to authorize the user to access the client application 330. To carry out the multi-factor authentication, the authenticator 355 can transmit the validation request to the client 320 (e.g., via the application server 310 and the application 330) to perform the first part of the multi-factor authentication. The first part of the multi-factor authentication can be performed in a similar manner as described above when the one-factor authentication is to be performed. The authenticator 355 can receive a response from the client 320 to the validation request. The response can include credentials of the user.

If valid, the authenticator 355 can transmit a second validation request (e.g., MFA request) to the client 320 from which the request originates or the authentication device 325 associated with the user. The authentication device 325 can be associated with the user of the client 320 (e.g., via the same account identifier). In some implementations, the second validation request can be an addition prompt, a push notification, one-time password (OTP), among other MFA techniques. The user can gain access by accepting access via the push notification or provide the OTP (e.g., via the application 330), for example. Accordingly, the identity provider 315 can receive a response to the second validation request and, if valid, can provide access to the application to the client 320.

The authentication device 325 can in turn receive a push notification (or other MFA techniques) from the identity provider 315 indicative of a second validation request. If the user accepts or acknowledges an access request via MFA rendered on the authentication device 325, the identity provider 315 can provide access to the client 320. Otherwise, for example, if the push notification timed-out or the user rejects the access request rendered on the authentication device 325, the identity provider 315 may reject the access request, transmit a notification indicating for the user to reattempt MFA (e.g., notification can be sent to the client 320 and/or the authentication device 325), restrict access for client 320, or provide a selection of MFA techniques for the user to reattempt.

The authentication device 325 can be referred to as a registered device, an MFA device, or a second device of the user. The authentication device 325 can be configured, registered, or set up to receive a push notification, one time password (OTP) prompt, among other MFA techniques when at least one client 320 attempts to access the application. The authentication device 325 can receive one or more notifications for MFA from the identity provider 315. The authentication device 325 can receive the notifications after the client 320 pass or is successful with a first authentication process (e.g., provided valid username and password associated with the authentication device 325). For example, the authentication device 325 can be associated with at least one of a username, an email address, a phone number, a name, among other information or credential for verifying the user identity through the first authentication request.

In some implementations, the client 320 can receive one or more other notifications or prompts from the application server 310 or the identity provider 315. The client 320 can be prompted for a second verification of user identity, such as in MFA. For example, after completing the first authentication request, the client 320 can receive a second validation request in a different validation technique (e.g., push notification, OTP, email verification, etc.). In the case of a push notification or OTP, which can be provided to a registered device associated with the user, the client 320 can be verified once the user confirms the push notification or input the OTP that appeared on the registered device.

In some implementations, the client 320 can be blocked or restricted of accessing the application after failing to identify the identity of the user (e.g., a number of failed attempts to access the system). The number of failed attempts can be provided or configured by an administrator of the application, the application server 310, or the identity provider 315, such as 3 times, 5 times, etc. To make further attempts or otherwise regain access, the client 320 can wait for a period of time (e.g., 1 hour, 2 hours, etc. from access restriction), request a different authentication technique, reset credentials (e.g., password reset via email confirmation), among techniques to verify the user. The client 320 can regain access to the application or regain at least one attempt to verify the user identity, responsive to completing at least one of the other verification techniques.

If the client 320 successfully verified the second validation request (e.g., the MFA), the client 320 can receive access or resources to the application. Otherwise, the client 320 may receive a notification from the server to retry the MFA or, in some cases, revert back to a first validation request where the user can provide credential information or a different validation technique. Validation techniques can sometimes be referred to as authentication techniques. In some implementations, the client 320 can receive a choice of which MFA technique the user would like to authenticate with. The client 320 can transmit an indication of the user selection to one of the provided choices, where the identity provider 315 can respond with the MFA of the user's choice.

In some implementations, the client 320 can gain access to the application, such as after providing valid credentials and confirming MFA. In some implementations, the application server 310 can receive a termination request from the clients 320. The termination request can be transmitted when the users of the clients 320 provide an input indicating an interaction with a terminate button (e.g., exit icon). The application server 310 can terminate the process or execution of the application, halt an application session, or disable visibility of the application. Based on monitoring the user activities, the application server 310 can determine that the user of the clients 320 are inactive or away-from-keyboard after a predetermined time of no interaction (e.g., clicks, mouse movement, or a keypress). The predetermined time can be set by the administrator of the application or, in some cases, by the user using the application. After the predetermined time of inactivity, the application server 310 can terminate the application.

The authenticator 355 can receive credential information from one or more clients 320. The authenticator 355 can compare the credentials from the one or more clients 320 to entries of an authentication table (e.g., hash table or list of authorized users) stored in the database 360. Individual entries can include a list of user identification or credentials authorized to access a respective application. For example, the authenticator 355 can compare credentials from the client 320 to a respective authentication table of the application the user attempts to access. Individual entries in the table can include at least username, password, email, among other user information used to verify the identity of the user. If credentials from the client 320 match an entry, the authenticator 355 can either provide access to the client 320 or transmit a second authentication request to the client 320 for MFA.

In some implementations, the profile generator 350 can refresh, remove, or otherwise delete the user profiles (or any associated records) in accordance with a schedule. For example, the profile generator 350 can remove all the user profiles maintained on the identity provider 315 at the end of each day or each week. As such, since any records of the previous request from the client 320 as successfully authenticated is removed, the profile generator 350 can generate a new user profile upon receiving a new request to authenticate. In addition, the profile generator 350 can determine a new risk level for the user of the client 320. The authenticator 355 can also rely on the new user profile or the risk level to determine whether to initiate the one-factor authentication or the multi-factor authentication. The functionalities of the system 300 can be repeated for the new request subsequent to the removal of the user profile.

Thus, by monitoring conditions or factors indicated above for over a period of time, such as days or weeks, the profile generator 350 can build a user profile. The authenticator 355 can compare the context between the authentication attempt from the user to the generated user profile to determine the risk. In some implementations, the user profile can be or indicate a threshold for the risk levels (e.g., low risk, high risk, or other risk levels in between). Therefore, by comparing the context of the user (e.g., IP address consistency, no user using the same IP address, user pattern, or authentication device 325 location) to the user profile associated with the user, the identity provider 315 can determine to use one-factor authentication if the risk is low and MFA otherwise.

Figure 4:
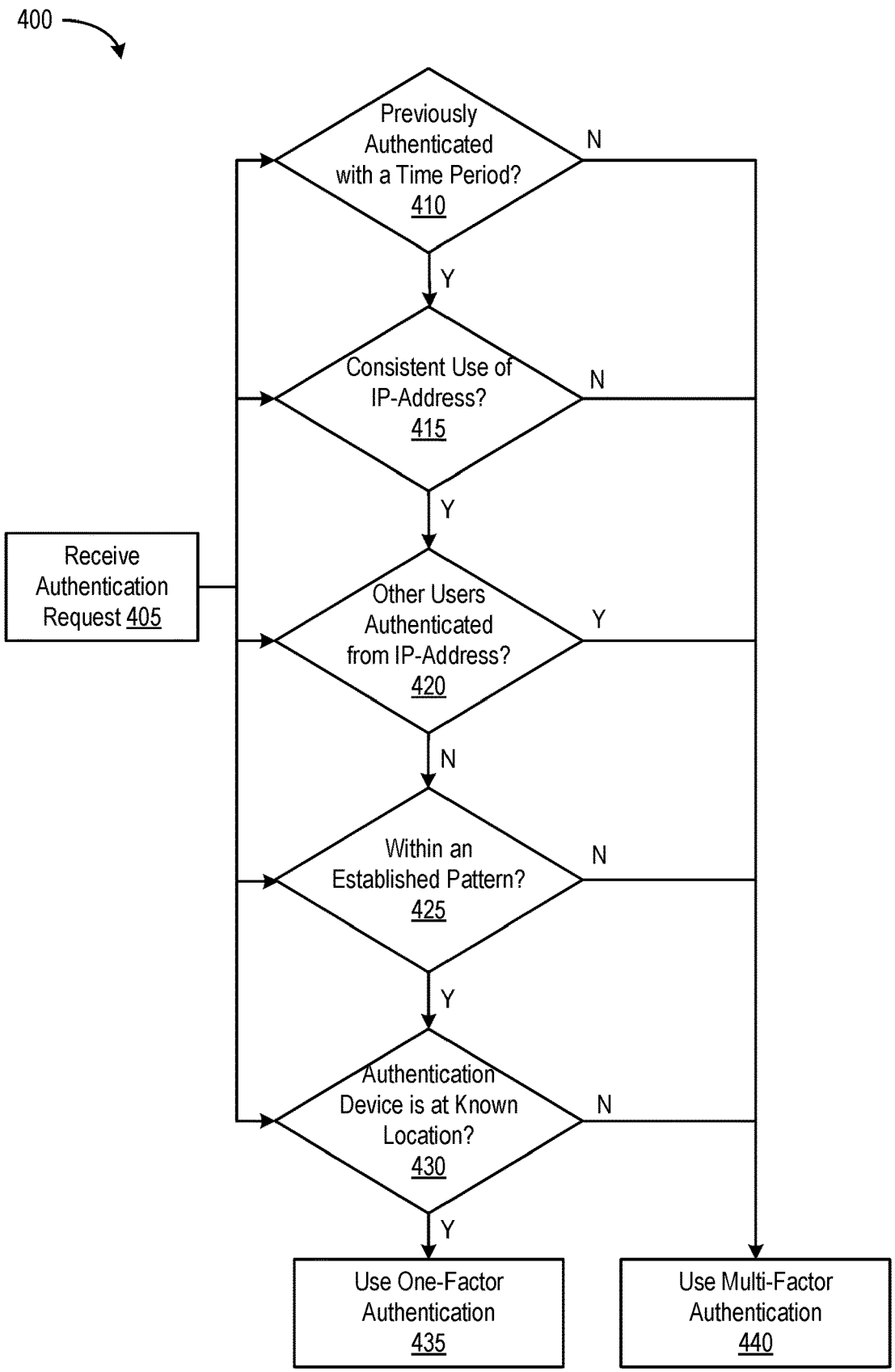
FIG. 4 is a flow diagram of a method for initiating one-factor or multi-factor authentication, in accordance with an illustrative embodiment.

Referring now to FIG. 4, depicted is a flow diagram of a method for minimizing MFA prompts based on a risk of the authentication attempt, in accordance with an illustrative embodiment. The example method 400 can be executed, performed, or otherwise carried out by one or more components of the system 300 (e.g., dedicated network 305, application server 310, identity provider 315, clients 320, authentication device 325, network 335, or database 360), the computer 100, one or more components of the system 200, or any other computing devices described herein in conjunction with FIGS. 1A-2C. In brief overview, an identity provider, an authentication request (405). The identity provider can determine whether the user (e.g., client 320, client, or user account) has previously been authenticated (410). The identity provider can determine whether there is the consistency of the IP address from which one or more applications are accessed or executed (415). The identity provider can determine whether other users authenticated from the IP address (420). The identity provider can determine whether the request to authenticate is within an establish pattern (425). The identity provider can determine whether an authentication device (e.g., authentication device 325) is at a known location (430). The identity provider can determine to use one-factor authentication (435). The identity provider can determine to use MFA (440).

In further detail, an identity provider can receive a request to authenticate a user to enable access to an application by the user (405). The identity provider (e.g., the identity provider 315) can receive the request directly from the user (e.g., a client device of the user) or forwarded from an application server (e.g., application server 310) in communication with the client device. For example, the identity provider can establish a trusted connection with an application server that manages the applications installed on the client device or a remote desktop. Accordingly, instead of the application server receiving the request, the identity provider can receive the redirected request from the client device to authenticate the user for access to an application. The identity provider can determine whether to provide user access to an application, which can refer to at least one of providing access to a user account, launching an application, executing an application, or enabling one or more features of an application.

The identity provider can receive the request from the client device in data (e.g., in data packets). The data can originate from an IP address (e.g., source IP address). For example, data packets can include IP address information within the header of the data packets. The IP address indicated in the request can be external to a network hosting the application, such as at a dedicated network different from a corporate network in which the application resides. For example, an enterprise or a corporation can provide or host applications (e.g., SaaS applications) on the network having a first IP address. The identity provider can receive the request from the user originating from a second IP address different from the first IP address (e.g., indicating that the user is not connected to the network hosting the application or not at the associated enterprise). Therefore, the identity provider can determine whether to use MFA or one-factor authentication. In the case of the user requesting accessing an application within the network hosting the application, the user may not be prompted with MFA, for example, since the client device is connected to a trusted network.

The identity provider can determine that a previous request to authenticate the user originated from the IP address and was approved based on successful completion of MFA by the user. For example, before receiving the request to authenticate the user, the identity provider can identify whether the user or the client device has historically (e.g., based on historical data of the user or a record of authenticated users) accessed other applications, such as one or more applications associated with the same identity provider providing the MFA. If the identity provider determines that the user has not previously accessed any other applications (e.g., authenticated by the same identity provider as the requesting application), the identity provider can proceed to step 440, without proceeding to steps 410-430, for example. However, if the identity provider determines that the user has previously accessed at least one other application after successfully completing MFA provided by the identity provider (e.g., the identity provider previously provided the MFA), the identity provider can consider one or more conditions (e.g., proceed to steps 410-430) to determine if sufficient to use one-factor authentication or if MFA should be initiated. The identity provider can proceed to one or more of steps 410-430 in any order. When referring to the conditions discussed below, the identity provider can include a metric that tracks the conditions (e.g., scores, counter, or risk level associated with satisfying or not satisfying one or more conditions). The identity provider can associate the metric to a user profile (e.g., different from a user account) generated based on patterns, behavior, among other information associated with the user's requests to authenticate or accessing of one or more applications. When a condition is not met, the metric can be reset or adjusted downward to indicate the risk level associated with the attempt to authenticate for the respective user profile.

The identity provider can determine whether the user has previously been authenticated within a time period (410). The time period can be referred to as a predetermined timeframe that the identity provider is keeping the user signed in or remember not to ask the user for MFA for the previously accessed application. The user can provide an input to an interactive element of the MFA to prevent the identity provider from prompting MFA for the particular application. In some cases, the identity provider can automatically not provide MFA for the client device with the predetermined time after accessing the respective application using MFA. The time period can be set or configured by the administrator of the identity provider or the application, such as 1 hour, 2 hours, 4 hours, etc. For other applications, the identity provider can determine whether the request received from the client device is within the time period.

For example, if the identity provider determines that the user has previously authenticated but is outside the time period, the identity provider can proceed to step 440. In this case, the identity provider may not proceed or consider other conditions, such as in steps 415-430. In some implementations, the identity provider can consider other conditions before determining to use the MFA to authenticate the user. For example, different conditions described herein can be a part of the risk level analysis. By failing to meet one or more conditions, the risk level (e.g., risk score, where a higher score indicates higher risk and a lower score indicates lower risk) can increase, and by satisfying one or more conditions, the risk level can decrease. In some implementations, failing to meet at least one of the conditions can reset the risk score, such as starting at a high-risk level (e.g., $60/100$, $70/100$, $80/100$, etc.). In these cases, the factor to determine whether to use one-factor authentication or MFA can be based on the score satisfying a score threshold (e.g., one-factor authentication for scoring below $20/100$, etc.).

By satisfying this condition, the identity provider can proceed to consider one or more other conditions, which can be in no particular order, for example. In some implementations, if this condition is not satisfied, the identity provider can proceed to step 440. Similar scenarios can be applied to the consideration of other conditions described herein, such that the identity provider can analyze a risk score, proceed to step 435 if all conditions are satisfied, or proceed to step 440 if any one of the conditions is not satisfied.

The identity provider can determine whether IP address usage from which the user accesses or executes one or more applications (415). Consistency of the IP address use can be based on a number of times that the user had authenticated from that IP address when accessing or executing the one or more applications associated with the same identity provider. The identity provider can compare the number of times that the user had authenticated from the IP address to a threshold. Here, the threshold can be different from the threshold of the time period from the previous request to access at least one other application.

For example, the identity provider can determine whether the number of times the client device requests to access one or more applications is greater than a threshold. The threshold can represent a score, e.g., with a higher score indicating that the requests for applications are often from the IP address and a lower score indicating that the requests are not often from the IP address. The threshold can be configured by the administrator of the identity provider (e.g., 10 times, 15 times, etc.). The identity provider can reset this number of times, for example, at every calendar cycle including every week, month, or quarter. In some implementations, the identity provider can reset the number of times if one of the conditions is not satisfied.

The number of times can be sequential or non-sequential. The identity provider can include a tracker or a counter to determine the number of times for comparison with the threshold. For example, the identity provider can track the number of times the user access the applications, such as 3-times in a row, 5-times, 10-times, etc. The identity provider can identify, sequentially, the highest number of times the user access applications from the IP address, such as before accessing the application from a different IP address or a value currently tracked by the identity provider. The identity provider can compare this sequential number of times to a threshold to determine the consistency of the IP address the applications are being accessed or executed from.

In another example, the identity provider can include a counter to count the total number of times the user accesses the applications from the IP address, such as a total of 3-times, 5-times, 10-times, etc. In this case, the identity provider can determine that within a predetermined timeframe (e.g., a day, a week, etc.), if the user accesses the applications from the IP address greater than a threshold, the IP address is consistent. The tracker or counter can be implemented for each user or IP address. For example, the identity provider can either keep the tracker or the counter for each user (e.g., listing IP addresses from which the applications are accessed or executed) or for each IP address (e.g., listing user accounts accessing the applications). The identity provider can consider other conditions before proceeding to step 435 if this condition is satisfied (e.g., IP address is consistent) or step 440 if this condition is not satisfied. In some implementations, this condition is not satisfied, the identity provider can proceed to step 440 without considering other conditions.

The identity provider can determine whether other users authenticated from the IP address (420). The user requesting authentication can be referred to as a first user, and other users can be referred to as a second user(s). The identity provider can determine that no other user has authenticated, accessed, or executed an application from the IP address. The application can be one of the applications associated with the same identity provider. The identity provider can determine if at least one other user has initiated an authentication request or accessed an application (e.g., a different account of an application) from the IP address. The identity provider can make this determination within at least a time period from the previous request authenticating the user (e.g., previous instance that the user gains access to another application).

For example, if the identity provider previously received a request to authenticate a second user different from the user (e.g., a first user or the client device) transmitting the current request to authenticate, or provided access to one or more other users, the identity provider can determine that the IP address of the request may be of relatively higher risk (e.g., not low risk or medium risk, depending on a total risk score based on all conditions). In other words, the identity provider can associate having other users accessing applications from the same IP address as the current user (e.g., user currently requesting authentication) to a higher risk IP address, which can be associated with the location of the user or an access point the client device is connected to.

In some implementations, the identity provider can determine the last time (e.g., the previous date, time gap, if any) that at least one other user accesses an application from an IP address similar to the first user. Further, the identity provider can determine the number of times the first user has previously authenticated or access an application after the previous time the second user request for or access an application. For example, if the second user previously requested for an application within a time threshold (e.g., which can be predetermined to 1 day, 3 days, 1 week, etc.) or within a count threshold (e.g., which can be predetermined to 10-times, 15-times, 20-times, etc.) from the first user requesting access, the identity provider can determine that the attempt to authenticate may be of higher risk (e.g., increase in risk score, among other risk calculation metrics).

Otherwise, if the second user previously requested for an application beyond a time threshold or a count threshold, the identity provider can determine that the attempt to authenticate can be of lower risk (e.g., other users not likely to authenticate from the same IP address as the first user). In some implementations, the identity provider can count or track the number of times the user accessed the application(s) from the last time (if any) other users accessed the application(s). The identity provider can reset the count if another user requests access to the application. The identity provider can compare the number of times the user accessed the application(s) to a count threshold to determine whether other users are likely to access the application from the IP address (e.g., a higher count can indicate less risk while a lower count can indicate high risk).

Accordingly, if no other users authenticated from the IP address (e.g., or in some cases the previous request from other users past one of the thresholds), the identity provider can proceed to consider other conditions. If other conditions are considered, depending on the risk score, if a sufficient amount of conditions are satisfied (e.g., configurable by the administrator based on which weighted conditions are satisfied), or if all other conditions are satisfied, the identity provider can proceed to step 435. Otherwise, if this condition is not met, the identity provider can either proceed to step 440 or consider other conditions if not already done so.

The identity provider can determine whether the request to authenticate the user is within an established pattern (425). An established pattern can refer to user behavior or routines, such as associated with information monitored or recorded when the identity provider receives data packets or requests from the client device. For example, the identity provider can monitor the pattern of the user throughout a period of days, weeks, among other time periods. The identity provider can identify a time pattern of the user when requesting access to an application. For example, the identity provider can determine that the client device often sends a request to authenticate the user between a time period (e.g., 8 AM-9:30 AM or 1 PM-2:30 PM). If the identity provider receives the request at a time outside this established time pattern (in some cases with error margin), the identity provider may determine that the authentication attempt is associated with a higher risk level or scenarios. Otherwise, if the identity provider identifies that the time of the request falls within an established time pattern for the user, the identity provider can determine that the authentication attempt is not high risk.

In another example, the identity provider can monitor the location of the client device or the access point the client device is connected to when requesting authentication. The identity provider can identify that when receiving a request to authenticate, the client device is often (e.g., 8 out of 10 times or 9 out of 10 times) at a first location (e.g., at home) or a second location (e.g., at a private office that only the user accesses one or more applications). Hence, if the user (e.g., client device of the user) is at the first location or the second location, the identity provider can determine that the authentication attempt is potentially low risk or not of high risk. Otherwise, the identity provider can determine that the authentication attempt may be of higher risk.

The identity provider can proceed to consider other conditions before proceeding to either steps 435 or 440. In some implementations, the identity provider can proceed to step 435 if all other conditions (or a risk score) are satisfied. In some other implementations, the identity provider can proceed to step 440 if at least one condition is not satisfied.

The identity provider can determine whether the authentication device associated with the client device is at a known location (430). The authentication device can be referred to as a second device or a registered device, which may be different from the client device transmitting the request to authenticate the user. The authentication device can be registered with a user account that the client device is attempting to access. The identity provider can identify that the authentication device is the second device registered for transmitting an MFA verification (e.g., push notification, OTP, etc.).

The authentication device can be located at a different location from the client device. The identity provider can determine the location of the authentication device based on, for example, a push application installed on the authentication device reporting the location to the identity provider. In some implementations, the identity provider can receive, from the push application of the authentication device, the location based on an IP address from which the authentication device communicates to the network or an access point the authentication device is connected to.

The identity provider can be configured to determine that if the authentication device (e.g., the second device) is at a location of the client device (sometimes referred to as a third device) having the same or associated with the IP address, the risk is low for the authentication attempt since the identity provider to confirm MFA is at the same location. For example, the identity provider can identify that a second device with which the user has performed the MFA prior to the current authentication request is at a location of a third device having the IP address. The identity provider can decrease the risk level or the risk score if the user devices are at the same location having the same IP address. Otherwise, the identity provider may increase the risk score if the location or the IP address is different between the second device and the third device. In some implementations, the score can increase based on the distance between the two devices. For example, if the two devices are 5 miles apart, the identity provider can increase the risk score by 5 out of 100, or if the two devices are 15 miles apart, the identity provider can increase the risk score by 15 out of 100. The increase or decrease score may be linear or exponential based on the increase or decrease in the distance, for example. Accordingly, if the locations are the same between the second device and the third device, the identity provider can consider other conditions (if not already done so) or proceed to one of steps 435 or 440. The identity provider can proceed to step 435 if all conditions are met or if the risk score is below a threshold (e.g., 20 out of 100, 30 out of 100, or other thresholds configurable by the administrator). The identity provider can proceed to step 440 if at least one of the conditions is not met or if the risk score is above or equal to the threshold. In some implementations, the identity provider may omit the check to determine whether the authentication device is at a known location (or if the location can be identified). For example, the identity provider can determine that the risk level is low for the authentication attempt if the user satisfies conditions 410-425 (or at least some of conditions 410-425). Accordingly, the identity provider can proceed to step 435 without step 430 if other conditions are satisfied, for example.

The identity provider can initiate or use one-factor authentication instead of another MFA to authenticate the user and to allow the user access to the application (435). The identity provider can determine to use one-factor authentication based on satisfying one or more conditions of steps 410-430, for example. The identity provider can consider whether to initiate one-factor authentication if at the minimum, for example, the identity provider has previously authenticated the user (e.g., authenticated the request from the client device) to access one or more applications within a threshold of a time period (e.g., 1 hour, 2 hours, 4 hours, etc.). In further example, the identity provider can determine to initiate or use one-factor authentication responsive to determining that the user had authenticated the number of times from the IP address using the MFA within a threshold of a time period from the previous request, in pair with satisfying at least one of the conditions discussed above, including, but not limited to, i) using the MFA greater than the second threshold, ii) that no other user has authenticated from that IP address within at least the time period, iii) that the time of the request falls within the established time pattern for the user, or iv) that the second device is at the location of the third device. The identity provider can determine to initiate one-factor authentication based on satisfying different pairs or combinations of conditions.

In some implementations, each condition can be weighted or associated with different risk scores, such that based on an accumulated score for satisfying/not satisfying one or more conditions, the identity provider can determine to use or initiate one-factor authentication. The weight for each condition can be configurable by the administrator. For example, a first condition can be weighted at 30 out of 100 in the risk score, a second condition can be weighted at 10 out of 100, and other conditions (e.g., third to fifth conditions) can be weighted at 20 out of 100. In this case, when accumulating the weights, the total adds up to 100. However, the weight of the conditions can be configured such that adding the total weight can be above or below the weight limit, for example. The identity provider can add each weighted score when a condition is not satisfied, such that a higher score can indicate a higher risk of the attempt to authenticate. In this scenario, if the score threshold is set to 20 out of 100 and the first condition is not met (e.g., having an initial score of 30 out of 100), the identity provider can proceed to step 440. If the first condition and other conditions are satisfied but the second condition is not (e.g., having a total score of 10 out of 100), the identity provider can still proceed to initiate one-factor authentication. The opposite scoring system can be implemented, such that a higher score indicates lower risk, depending on the implementation of the scoring system configurable by the administrator of the identity provider.

Accordingly, responsive to receiving a request to authenticate, if the conditions are satisfied or at least the risk score does not exceed a threshold, the identity provider can proceed to use a one-factor authentication. The identity provider can initiate one-factor authentication by transmitting a request for credentials (sometimes referred to as a request for authentication information) to the user. After receiving the user's credentials, the identity provider can determine if the credentials matched what is on record, for example, stored in a database. If matched, the identity provider can provide access to the user. However, if not matched with the credentials of the user or any credentials on record, the identity provider can transmit a second request for credentials. After a number of times (e.g., 3-times, 5-times, etc.) the client device fails to provide valid credentials, the identity provider may reset a counter, a tracker, or information associated with at least one of the conditions described above. Therefore, when the identity provider receives another request from the client device, the identity provider can proceed to step 440.

The identity provider can use or initiate MFA in response to receiving the request to authenticate the user (440). For example, the identity provider can determine that at least one of the conditions is not satisfied. If at least one condition is not satisfied, the identity provider can initiate MFA for the user. In this case, not satisfying any of the conditions can indicate a high-risk authentication attempt by the client device. In some implementations, if the risk is based on a score, the identity provider can determine the score associated with each condition (e.g., which may or may not be weighted). The identity provider can accumulate the score based on whether each condition is satisfied (or not satisfied). The identity provider can compare the accumulated score to a threshold to determine the risk level. Based on the comparison, if the score exceeds the threshold, the identity provider can use the MFA for the user. By using MFA, the identity provider can transmit a request for credentials to the client device. The identity provider can receive credentials from the client device, which can be compared to the credential record. If matched at least one of the listing in the record, the identity provider can transmit a push notification or prompt an authentication device for confirmation (e.g., or send OTP, among other prompts based on the MFA technique). After confirmation with the MFA prompt, the identity provider can enable the user to access the requested application.

Figure 5:
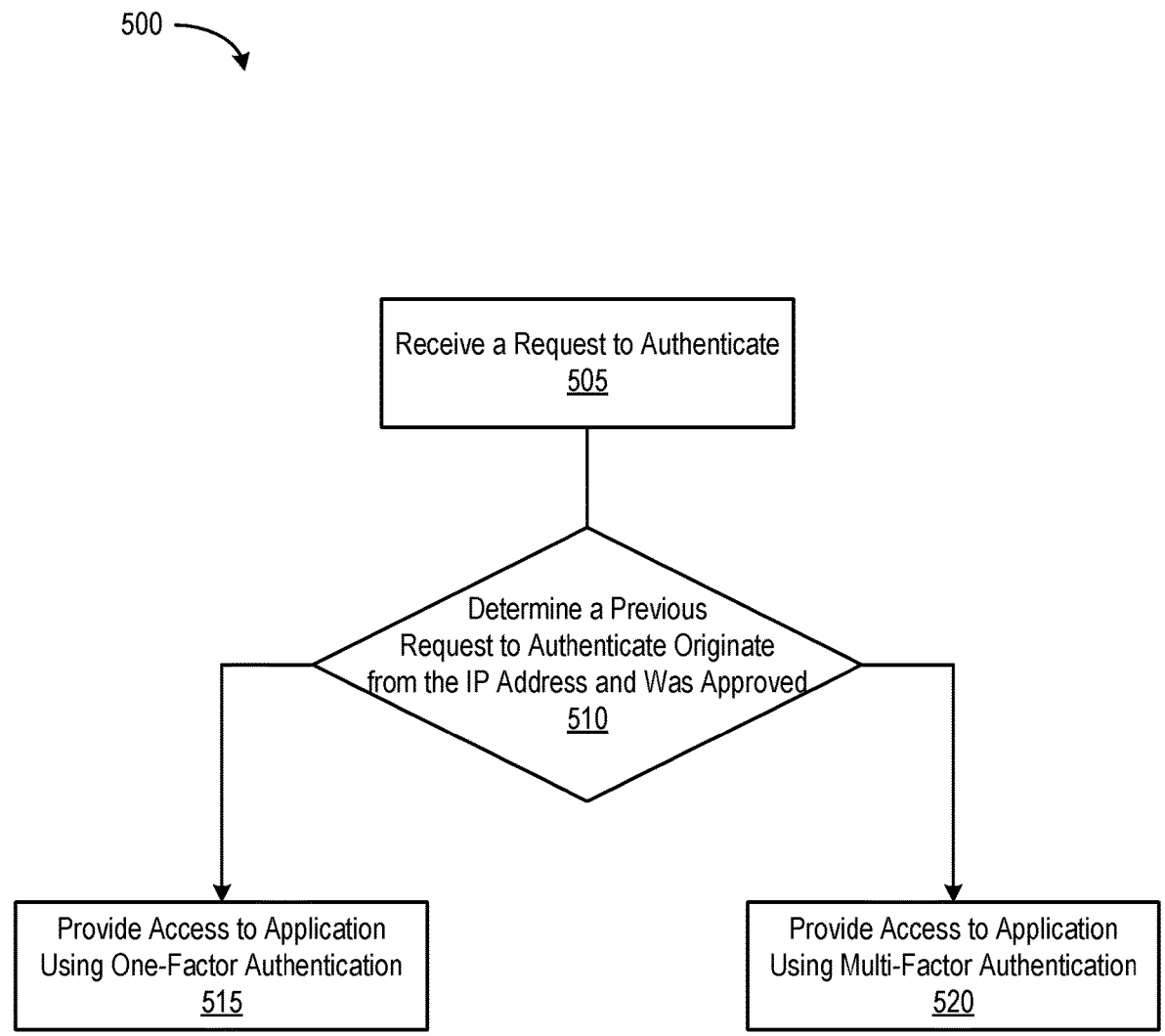
FIG. 5 is a flow diagram of a method for providing access to application using one-factor authentication, in accordance with an illustrative embodiment.

Referring now to FIG. 5, depicted is a flow diagram of a method for providing access to an application using one-factor authentication, in accordance with an illustrative embodiment. The example method 500 can be executed, performed, or otherwise carried out by one or more components of the system 300 (e.g., dedicated network 305, application server 310, identity provider 315, clients 320, authentication device 325, network 335, or database 360), the computer 100, one or more components of the system 200, or any other computing devices described herein in conjunction with FIGS. 1A-2C. A device can receive request to authenticate a user to enable access to an application by the user. The request can originate from an Internet Protocol ("IP") address external to a network hosting the application (505). The client can transmit the request to authenticate the user via the application. The device (e.g., a device of the identity provider) can receive the request to authenticate from the client.

The device can determine whether a previous request to authenticate the user originated from the IP address and the previous request to authenticate from the user was approved based on successful completion of multi-factor authentication ("MFA") by the user (510). For instance, after the client transmitted the previous request from the IP address, the user of the client can provide valid credentials and MFA confirmation to the identity provider. Based on the determination that the previous request was approved, the identity provider can consider various other conditions to determine whether to provide one-factor authentication or MFA in response to the current request to authenticate.

In no particular order, the identity provider can, first, determine if the client was previously authenticated within a time period. Secondly, the identity provider can determine the consistency of the user accessing the application from the IP address. Thirdly, the identity provider can determine if other users have authenticated or access the application (or other application managed by the identity provider) from the same IP address as the request to authenticate. Fourthly, the identity provider can determine if the access request is within an established parameter based on the user profile generated for the user over time (e.g., a week, a month, etc.).

The established parameter can indicate a timeframe the user often access the application, the order of one or more applications requested for access (e.g., if the user often accesses multiple applications within the timeframe), among other parameters. Fifthly, the identity provider can determine if the authentication device (or registered device) is at a known location, such as the same location as the client, at a known historical location (e.g., based on historical location recorded in the user profile), or connected to the network at a known IP address (e.g., associated with the location of the authentication device or an access point the authentication device is connected to).

When the previous request is determined to originate from the same IP address and was approved, the identity provider can provide the user with access to the application using one-factor authentication instead of the multi-factor authentication (515). Based on the policies or rules configured by either the administrator of the identity provider or the application server, the identity provider can provide one-factor authentication when either multiple of these conditions or all of the conditions are met. For example, if a scoring metric is used to determine the risk level of the user (e.g., high risk indicating that MFA should be used or low-risk indicating that one-factor authentication can be used), then the identity provider can provide one-factor authentication if multiple conditions are met, which exceeds a threshold indicating a low-risk user. Otherwise, the identity provider can provide MFA for authenticating the user. In other cases, based on the policies, the identity provider can provide one-factor authentication if all conditions are met (e.g., indicating a low-risk access or authentication request). In this case, if at least one condition is not met (e.g., indicating a non-low-risk access request or request to authenticate), the identity provider may provide MFA for authenticating the user.

When the previous request is determined not to originate from the same IP address or was not approved, the identity provider can provide the user with access to the application using MFA (520). For example, the identity provider can determine that the previous request to access the application (e.g., at least within a time period) is from an IP address different from the IP address associated with the current request. Since the previous request originate from a different IP address, the identity provider can use MFA for the current access request from the client. In another example, if the previous request is from the same IP address but was not approved (or access was denied), the identity provider can determine to use MFA in response to the current access request (e.g., similar to using MFA on the user of the previous request to access the application). In some cases, the identity provider can provide the user with access to the application using MFA if one or more other conditions are not satisfied. For example, if the previous request to authenticate originate from the IP address and was approved, but one or more other conditions (e.g., conditions discussed above) are not satisfied, the identity provider can also provide the user with access to the application using MFA.

FURTHER EXAMPLE EMBODIMENTS

The following examples pertain to further embodiments, from which numerous permutations and configurations will be apparent.

Example 1 includes a method including: receiving, by a device, a request to authenticate a user to enable access to an application by the user, the request originating from an Internet Protocol (IP) address external to a network hosting the application; determining, by the device, that a previous request to authenticate the user originated from the IP address and was approved based on successful completion of multi-factor authentication by the user; and providing, by the device responsive to the determination, the user with access to the application using one-factor authentication instead of the multi-factor authentication.

Example 2 includes the subject matter of Example 1, further comprising determining, by the device, that a number of times that the user had authenticated from that IP address is greater than a second threshold.

Example 3 includes the subject matter of any of Examples 1 and 2, further comprising using the one-factor authentication instead of another multi-factor authentication responsive to determining that the user had authenticated the number of times from the IP address using the multi-factor authentication greater than the second threshold and within a threshold of a time period from the previous request.

Example 4 includes the subject matter of any of Examples 1 through 3, further comprising determining, by the device, that no other user has authenticated from the IP address within at least a time period from the previous request.

Example 5 includes the subject matter of any of Examples 1 through 4, further comprising using the one-factor authentication instead of another multi-factor authentication responsive to determining that the user had authenticated from the IP address using the multi-factor authentication within a threshold of the time period from the previous request and that no other user has authenticated from that IP address within at least the time period.

Example 6 includes the subject matter of Example 5, further comprising determining, by the device, that a time of the request falls within an established time pattern for the user.

Example 7 includes the subject matter of any of Examples 1 through 6, further comprising using the one-factor authentication instead of another multi-factor authentication responsive to determining that the user had authenticated from the IP address using the multi-factor authentication within a threshold of a time period from the previous request and that the time of the request falls within the established time pattern for the user.

Example 8 includes the subject matter of any of Examples 1 through 7, further comprising identifying, by the device, that a second device with which the user has performed the multi-factor authentication is at a location of a third device having the IP address.

Example 9 includes the subject matter of any of Examples 1 through 8, further comprising using the one-factor authentication instead of another multi-factor authentication responsive to determining that the user had authenticated from the IP address using the multi-factor authentication within a threshold of a time period from the previous request and identifying that the second device is at the location of the third device.

Example 10 includes a device comprising one or more processors, coupled to memory and configured to: receive a request to authenticate a user to enable access to an application by the user, the request originating from an Internet Protocol (IP) address external to a network hosting the application; determine that a previous request to authenticate the user originated from the IP address and was approved based on successful completion of multi-factor authentication by the user; and provide, responsive to the determination, the user with access to the application using one-factor authentication instead of the multi-factor authentication.

Example 11 includes the subject matter of Example 10, wherein the one or more processors are further configured to determine that a number of times that the user had authenticated from that IP address is greater than a second threshold.

Example 12 includes the subject matter of any of Examples 10 and 11, wherein the one or more processors are further configured to use the one-factor authentication instead of another multi-factor authentication responsive to determining that the user had authenticated the number of times from the IP address using the multi-factor authentication greater than the second threshold and within a threshold of a time period from the previous request.

Example 13 includes the subject matter of any of Examples 10 through 12, wherein the one or more processors are further configured to determine that no other user has authenticated from the IP address within at least a time period from the previous request.

Example 14 includes the subject matter of any of Examples 10 through 13, wherein the one or more processors are further configured to use the one-factor authentication instead of another multi-factor authentication responsive to determining that the user had authenticated from the IP address using the multi-factor authentication within a threshold of the time period from the previous request and that no other user has authenticated from that IP address within at least the time period.

Example 15 includes the subject matter of any of Examples 10 through 14, wherein the one or more processors are further configured to determine that a time of the request falls within an established time pattern for the user.

Example 16 includes the subject matter of any of Examples 10 through 15, wherein the one or more processors are further configured to use the one-factor authentication instead of another multi-factor authentication responsive to determining that the user had authenticated from the IP address using the multi-factor authentication within a threshold of a time period from the previous request and that the time of the request falls within the established time pattern for the user.

Example 17 includes the subject matter of any of Examples 10 through 16, wherein the one or more processors are further configured to identify that a second device with which the user has performed the multi-factor authentication is at a location of a third device having the IP address.

Example 18 includes the subject matter of any of Examples 10 through 17, wherein the one or more processors are further configured to use the one-factor authentication instead of another multi-factor authentication responsive to determining that the user had authenticated from the IP address using the multi-factor authentication within a threshold of a time period from the previous request and identifying that the second device is at the location of the third device.

Example 19 includes a non-transitory computer-readable medium storing program instructions to cause one or more processors to: receive a request to authenticate a user to enable access to an application by the user, the request originating from an Internet Protocol (IP) address external to a network hosting the application; determine that a previous request to authenticate the user originated from the IP address and was approved based on successful completion of multi-factor authentication by the user; and provide, responsive to the determination, the user with access to the application using one-factor authentication instead of the multi-factor authentication.

Example 20 includes the subject matter of Example 19, wherein the program instructions cause the one or more processors to use the one-factor authentication instead of another multi-factor authentication responsive to determining that the user had authenticated from the IP address using the multi-factor authentication within a threshold of a time period from the previous request and identifying that a second device with which the user has performed the multi-factor authentication is at a location of a third device having the IP address.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
receiving, by a device, a request to authenticate a user to enable access to an application by the user, the request originating from an Internet Protocol (IP) address external to a network hosting the application;
determining, by the device, that a previous request to authenticate the user originated from the IP address and was approved based on successful completion of multi-factor authentication by the user; and
providing, by the device based on determining that the previous request to authenticate the user originated from the IP address and was approved based on successful completion of multi-factor authentication, the user with access to the application using one-factor authentication instead of the multi-factor authentication.

2. The method of claim 1, further comprising determining, by the device, that a number of times that the user had authenticated from that IP address is greater than a second threshold.

3. The method of claim 2, further comprising using the one-factor authentication instead of another multi-factor authentication responsive to determining that the user had authenticated the number of times from the IP address using the multi-factor authentication greater than the second threshold and within a threshold of a time period from the previous request.

4. The method of claim 1, further comprising determining, by the device, that no other user has authenticated from the IP address within at least a time period from the previous request.

5. The method of claim 4, further comprising using the one-factor authentication instead of another multi-factor authentication responsive to determining that the user had authenticated from the IP address using the multi-factor authentication within a threshold of the time period from the previous request and that no other user has authenticated from that IP address within at least the time period.

6. The method of claim 1, further comprising determining, by the device, that a time of the request falls within an established time pattern for the user.

7. The method of claim 6, further comprising using the one-factor authentication instead of another multi-factor authentication responsive to determining that the user had authenticated from the IP address using the multi-factor authentication within a threshold of a time period from the previous request and that the time of the request falls within the established time pattern for the user.

8. The method of claim 1, further comprising identifying, by the device, that a second device with which the user has performed the multi-factor authentication is at a location of a third device having the IP address.

9. The method of claim 8, further comprising using the one-factor authentication instead of another multi-factor authentication responsive to determining that the user had authenticated from the IP address using the multi-factor authentication within a threshold of a time period from the previous request and identifying that the second device is at the location of the third device.

10. A device comprising:
one or more processors, coupled to memory and configured to:
receive a request to authenticate a user to enable access to an application by the user, the request originating from an Internet Protocol (IP) address external to a network hosting the application;
determine that a previous request to authenticate the user originated from the IP address and was approved based on successful completion of multi-factor authentication by the user; and
provide, based on determining that the previous request to authenticate the user originated from the IP address and was approved based on successful completion of multi-factor authentication, the user with access to the application using one-factor authentication instead of the multi-factor authentication.

11. The device of claim 10, wherein the one or more processors are further configured to determine that a number of times that the user had authenticated from that IP address is greater than a second threshold.

12. The device of claim 11, wherein the one or more processors are further configured to use the one-factor authentication instead of another multi-factor authentication responsive to determining that the user had authenticated the number of times from the IP address using the multi-factor authentication greater than the second threshold and within a threshold of a time period from the previous request.

13. The device of claim 10, wherein the one or more processors are further configured to determine that no other user has authenticated from the IP address within at least a time period from the previous request.

14. The device of claim 13, wherein the one or more processors are further configured to use
the one-factor authentication instead of another multi-factor authentication responsive to determining that the user had authenticated from the IP address using the multi-factor authentication within a threshold of the time period from the previous request and that no other user has authenticated from that IP address within at least the time period.

15. The device of claim 10, wherein the one or more processors are further configured to determine that a time of the request falls within an established time pattern for the user.

16. The device of claim 15, wherein the one or more processors are further configured to use the one-factor authentication instead of another multi-factor authentication responsive to determining that the user had authenticated from the IP address using the multi-factor authentication within a threshold of a time period from the previous request and that the time of the request falls within the established time pattern for the user.

17. The device of claim 10, wherein the one or more processors are further configured to identify that a second device with which the user has performed the multi-factor authentication is at a location of a third device having the IP address.

18. The device of claim 17, wherein the one or more processors are further configured to use the one-factor authentication instead of another multi-factor authentication responsive to determining that the user had authenticated from the IP address using the multi-factor authentication within a threshold of a time period from the previous request and identifying that the second device is at the location of the third device.

19. A non-transitory computer-readable medium storing program instructions to cause one or more processors to:
receive a request to authenticate a user to enable access to an application by the user, the request originating from an Internet Protocol (IP) address external to a network hosting the application;

determine that a previous request to authenticate the user originated from the IP address and was approved based on successful completion of multi-factor authentication by the user; and provide, based on determining that the previous request to authenticate the user originated from the IP address and was approved based on successful completion of multi-factor authentication, the user with access to the application using one-factor authentication instead of the multi-factor authentication.

20. The non-transitory computer-readable medium of claim 19, wherein the program instructions cause the one or more processors to use the one-factor authentication instead of another multi-factor authentication responsive to determining that the user had authenticated from the IP address using the multi-factor authentication within a threshold of a time period from the previous request and identifying that a second device with which the user has performed the multi-factor authentication is at a location of a third device having the IP address.

* * * * *